United States Patent
McDaniel et al.

(10) Patent No.: US 11,657,689 B1
(45) Date of Patent: May 23, 2023

(54) CUSTOMIZED RETAIL ENVIRONMENTS

(71) Applicant: Amazon Technologies, Inc., Seattle, WA (US)

(72) Inventors: Aaron M. McDaniel, Seattle, WA (US); Nirmal Doshi, Bothell, WA (US); Nathan P. O'Neill, Snohomish, WA (US); Joel Stirling, Everett, WA (US); Joseph W. Chauvin, Sammamish, WA (US); Nir Charny, Redmond, WA (US); Kaigene Jennifer Lin, Bellevue, WA (US); Spencer Ralph Dodge, Covington, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/806,573

(22) Filed: Mar. 2, 2020

(51) Int. Cl.
*G06Q 30/06* (2012.01)
*G08B 13/24* (2006.01)
*G08B 13/14* (2006.01)
*G06Q 20/10* (2012.01)
*G06V 20/52* (2022.01)

(52) U.S. Cl.
CPC ....... *G08B 13/2462* (2013.01); *G06Q 20/102* (2013.01); *G06V 20/52* (2022.01); *G08B 13/1472* (2013.01); *G08B 13/246* (2013.01); *G08B 13/248* (2013.01); *G08B 13/2454* (2013.01)

(58) Field of Classification Search
None
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 * | 10/2016 | Kobres | G06Q 30/00 |
| 9,536,236 B2 * | 1/2017 | Hay | G07G 1/0036 |
| 10,943,285 B1 | 3/2021 | Grigsby et al. | |
| 10,963,834 B1 | 3/2021 | Thurston et al. | |
| 2006/0032915 A1 * | 2/2006 | Schwartz | G07F 7/00 235/383 |

(Continued)

OTHER PUBLICATIONS

Office Action for U.S. Appl. No. 16/806,484, dated Aug. 4, 2022, McDaniel, "Customized Retail Environments", 33 pages.

(Continued)

*Primary Examiner* — Brent Swarthout
(74) *Attorney, Agent, or Firm* — Lee & Hayes, P.C.

(57) ABSTRACT

This disclosure describes, in part, systems for enabling physical retail stores and other facilities to implement automated-checkout techniques for the purchase of items that are priced per unit weight. For example, the described systems may enable a facility to implement technology where users are able to remove items from inventory locations, place the items on weight sensors, and then be charged for the prices of the items without performing manual checkout of the items. The price of an item is determined based at least in part on the identifier of the item and the price per unit weight of the item. The systems described herein thus enable customized retail facilities, as opposed to a retail facility that allows automated-checkout only for prepackaged-type or otherwise non-customizable merchandise.

20 Claims, 11 Drawing Sheets

(56) References Cited

U.S. PATENT DOCUMENTS

| | | | | |
|---|---|---|---|---|
| 2013/0284806 A1* | 10/2013 | Margalit | ................ | G06Q 30/06 |
| | | | | 235/382 |
| 2015/0012396 A1 | 1/2015 | Puerini et al. | | |
| 2018/0285902 A1* | 10/2018 | Nazarian | ................ | G06F 15/76 |
| 2019/0333039 A1* | 10/2019 | Glaser | ................ | G06Q 20/208 |

OTHER PUBLICATIONS

Office Action for U.S. Appl. No. 16/806,484, dated Sep. 26, 2022, McDaniel, "Customized Retail Environments", 24 pages.

* cited by examiner

CUSTOMIZED RETAIL ENVIRONMENTS

BACKGROUND

Traditional physical stores maintain an inventory of items in customer-accessible areas such that customers can pick items from the inventory and take them to a cashier for purchase, rental, and so forth. In some instances, a price of an item may be based on a weight of the item. For example, a user may want to purchase a given number of items of a type of fruit, such as oranges. When the user takes the oranges to the cashier, the cashier may place the oranges on a scale that measures the weight of the oranges. The cashier may then determine the price for the oranges that is based on the weight. After determining the price, the cashier charges the customer for the price of the oranges.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
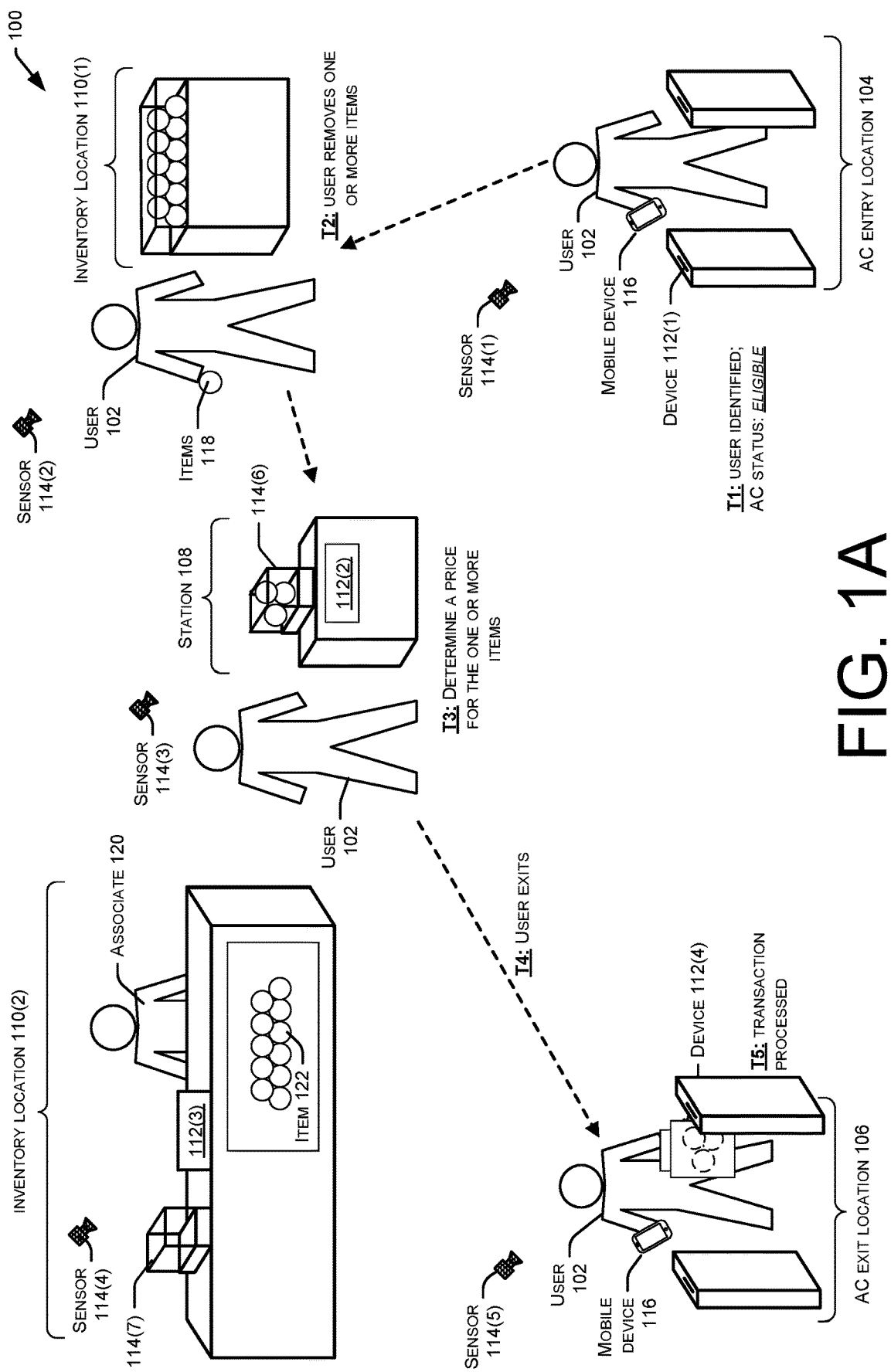
FIG. 1A illustrates an example facility associated with a system for enabling automated checkout (AC) techniques to allow users to enter the facility, remove items that are priced per unit weight, and exit the facility without performing a manual checkout of the items. To do so, the system coupled to the environment may identify an entering user and charge an account associated with the user for a price of the items upon exit of the user.

This disclosure describes, in part, systems for enabling facilities (e.g., physical retail stores) with items that are priced per unit weight to implement automated-checkout (AC) techniques for customers of the facilities. For example, the described systems may enable the facilities to implement technology where users are able to pick items from inventory locations (e.g., shelves, racks, cases, cabinets, bins, floor locations, etc.) and exit the facility without performing manual checkout of the items. In some instances, the price of one or more items may be based on the total weight of the one or more items (e.g., price per unit weight items). For example, the price of fruit, such as oranges, may be based on the total weight of the oranges that the user picks from the inventory location. The described systems may enable the facilities to implement technology in order to determine the prices of such items such that the users are still able to exit the facilities without performing manual checkouts.

More specifically, customized retail facilities include inventory locations housing one or more items that may be ordered, received, picked, and/or returned by users. These inventory locations may be associated with one or more sensors configured to generate sensor data indicative of events that occur with respect to the items housed thereupon. For example, these sensors may generate sensor data indicative of a user (and/or associated of the facility) removing an item from the inventory location, returning the item to the inventory location, and/or the like. These sensors may include overhead cameras, in-shelf cameras, weight sensors, and/or any other type of sensor configured to generate sensor data indicative of user interactions with the items. An inventory management system (system) may communicate with the sensors in order to receive the sensor data.

In addition, the facility may include, in some instances, one or more entry locations for entering the facility and one or more exit locations for exiting the facility. For example, the facility may include an AC entry location at which an entering user provides information for identifying an account of the user. For instance, the AC entry location may include a scanner or other imaging device at which an entering user scans or otherwise provides a unique code associated with the account of the user, such as a code displayed on a mobile device of the user. Or, the entry location may include a microphone, camera, or other sensor that generates sensor information at the request of the user for use in identifying the account of the user. In still other instances, the AC entry location may include an input device for reading information from a payment card of a user, such as a credit card, debit card, prepaid card, etc. For example, the AC entry location may include a scanner or camera that scans or captures an image of a payment card, a card reader that receives information from a payment card via a swipe, dip, tap, or the like, or may include any other type of input device configured to receive payment or account information.

In some instances, the account of the user may be associated with a payment instrument of the user such that the payment instrument is able to be charged for items procured by the user, with the charge occurring automatically upon exit of the facility by the user and without the user needing to engage in a manual checkout process of the items. Accordingly, the facility may include an AC exit location where an exiting user provides information for identifying an account of the exiting user. The AC exit location may include, similar to the AC entry location, a scanner or other imaging device at which the exiting user scans or otherwise provides a unique code associated with the account of the user, such as the code displayed on the mobile device of the user. Or, the AC exit location may include a microphone, camera, or other sensor that generates sensor data at the request of the user for use in identifying the account of the exiting user.

Note that the facility may also include entry and exit locations at which users may enter and exit without providing identifying information. For instance, users may be allowed access to the facility in a manner similar to a traditional retail facility to allow users to shop or otherwise interact with items at the retail facility without needing to provide information for identifying user accounts. In some examples, the user may be allowed to enter the facility, then provide information for identifying a user account at an ordering location within the facility. Also, at least one exit location may resemble a traditional exit location at a retail facility, including an associate of the facility operating a point of sale (POS) device to manually check out the exiting user, such as an exiting user wishing to pay for items in cash. Of course, it is to be appreciated that the facility may include self-checkout kiosks or any other technology for enabling manual checkout of the items within the facility.

Within this example facility, if a user enters through an AC entry location and provides information identifying an account of the user, or the user enters the facility and provides information identifying the account of the user at an ordering location, then the system associated with the facility may generate a record indicating the presence of the user at the facility. The record may store an identifier associated with the user, as well as an indication of whether the user is currently eligible to exit the facility (with items procured by the user) via the AC exit location.

In addition, sensor data generated from sensors at the facility may be used to determine current positioning of the user, which may also be stored in association with the record of the user. For example, overhead cameras, floor weight sensors, and/or the like may be used to maintain, in the record and at the knowledge and request/consent of the user, the current location of the user within the facility. Further, this sensor data (e.g., image data) may be used to locate the user as the user navigates through the store. Further, if the user interacts within one or more items housed at an inventory location, and/or orders a customizable item, the system may generate data indicative of the event. This data may comprise order data, indicating a result of the order of the customizable item or the interaction between the user and the customizable or non-customizable item. In some instances, this order data indicates an action taken (e.g., an order, a confirmation of an order, a pick of an item, a return of an item, etc.), a description or identity of the item acted upon (e.g., a latte, a bottle of ketchup, a pair of jeans, pieces of fruit, etc.), a quantity, weight, and/or size of the item involved, a location of the item (e.g., meat counter, aisle, shelf, lane, etc.), a price of the item, and/or the like.

In some instances, and as described herein, the facility may include one or more stations that allow users to purchase items that are priced based on the total weights of the items. These items may include, but are not limited to, produce, food bar items, bulk food items, pre-portioned items, meats, and/or any other items. The stations may include weight sensors (e.g., scales) that are used to determine the total weights of the items. For example, the weight sensors may include Legal for Trade (LFT) certified scales. The stations may further include one or more displays that provide information to the users that are weighing the items. The information may include, but is not limited to, identity(ies) of item(s) being placed on the weight sensors, the price per unit weight of the item(s), the total weight of the item(s), the total price of the item(s), and/or the like.

To acquire such items, a user may remove the item(s) from an inventory location located within the facility. In some instances, the system may receive sensor data, such as image data, representing the user removing the item(s). The system may then analyze the sensor data to determine that the user removed the item(s) from the inventory location. In some instances, the system may further analyze the sensor data to determine the number of item(s) removed from the inventory location and/or the size of the item(s) removed from the inventory location.

The user may then place the item(s) on the weight sensor at a station. An electronic device associated with the station may determine which item(s) have been placed on the weight sensor. In some examples, such as when the system determines the item(s) removed by the user, the system may send data to the electronic device that represents the identity(ies) of the item(s), which the electronic device may use to identify the item(s). Additionally, or alternatively, in some examples, the electronic device may receive input from the user that identifies the item(s) placed on the weight sensor. For instance, the user may use the display of the electronic device to search through possible items provided at the facility and select the item(s) placed on the weight sensor. While these are just a couple of examples of how the electronic device may identify the item(s), in other examples, the electronic device may use additional and/or alternative techniques for identifying the item(s).

The electronic device may then determine the price per unit weight of the item(s) being placed on the weight sensor (e.g., the weight of the item(s) multiplied by the price per unit weight of the item(s)). In some instances, the electronic device may store data indicating the price per unit weight of the item(s). In such instances, the electronic device may use the stored data, along with the identity(ies) of the item(s), to determine the price per unit weight. Additionally, or alternatively, in some instances, the electronic device may receive, from the system, data indicating the price per unit weight of the item(s). For example, after identifying the item(s), the electronic device may send a request to the system for the price per unit weight of the item(s). In either instance, the electronic device may then display the price per unit weight of the item(s) along with the identity(ies) of the item(s). This way, the user is able to confirm that the electronic device is creating an order for the correct item(s) and at the correct price.

As the user places the item(s) onto the weight sensor, the electronic device may continue to receive data from the weight sensor indicating the total weight of the item(s). Additionally, using the price per unit weight of the item(s), the electronic device may determine the total cost of the item(s) placed on the weight sensor. The electronic device may then use the display to present the total weight and the total cost to the user. If the user continues to remove and/or add item(s) to the weight sensor, the electronic device may continue to update the total weight and/or total cost associated with the item(s). In other words, the electronic device may continually provide the user with updated information in order to help the user through the ordering process.

Additionally, or alternatively, in some instances, as the user places the item(s) onto the weight sensor, the electronic device may send, to the system, data representing the total weight of the item(s). Using the price per unit weight of the item(s), the system may determine the total cost of the item(s) placed on the weight sensor. The system may then send data to the electronic device that indicates the total cost of the item(s). Additionally, the electronic device may again then use the display to present the total weight and the total cost to the user. If the user continues to remove and/or add item(s) to the weight sensor, the electronic device and system may continue to perform these processes to update the total weight and/or total cost associated with the item(s). In other words, the electronic device and system may continually provide the user with updated information in order to help the user through the ordering process.

The electronic device may then determine when the user is finished weighing the item(s). In some instances, the electronic device makes the determination based on receiving (e.g., via the display) an input indicating that the user is finished weighing the item(s). In some instances, the electronic device makes the determination based on the user removing the item(s) from the weight sensor. For example, once the user removes the item(s), the electronic device may receive data from the weight sensor that indicates that there is no longer any item(s) place on the weight sensor. Still, in some instances, the electronic device makes the determination based on receiving, from the system, data indicating that the user is no longer located proximate to the electronic device.

Based at least in part on determining that the user is finished, the electronic device may send data representing the order to the system. For example, the data may indicate at least a time of the order, identity(ies) of the item(s), the price per unit weight of the item(s), the total weight of the item(s), the total cost of the item(s), and/or the like. The system may receive the data from the electronic device and associate the order with the account of the user. In some instances, before associating the order with the account of the user, the system confirms that the user made the order for the item(s).

In some instances, to perform the confirmation, the system may analyze sensor data representing an area around the station to determine that the user was positioned around the station at the time of the order. In some examples, the system determines that the user was "positioned around" the station based at least in part on the user being located within a threshold distance to the station at the time of the order. As described herein, a threshold distance may include, but is not limited to, one meter, two meters, three meters, and/or any other distance. In some examples, the system determines that the user was positioned around the station "at the time of the order" based at least in part on the user being located within the threshold distance to the station within a threshold period of time to the time of the order. As described herein, the threshold period of time may include, but is not limited to, one second, five seconds, ten second, and/or any other time period.

In some instance, before associating the order with the account of the user, the system may determine that the user plans to remove the item(s) from the facility. In other words, the system may determine that the user has not returned the item(s) back to the inventory location (and/or another inventory location). In some instances, to make the determination, the system may analyze sensor data to determine that the user is in possession of the item(s) after leaving an area of the facility for which the inventory location of the item(s) and/or the station is located. As described herein, the area may include, but is not limited to, an aisle, a lane, a section, and/or the like of the facility. In some instances, to make the determination, the system may analyze the sensor data to determine that the user places the item(s) in a tote, a bag, and/or the like that is used to remove items from the facility. Still, in some instances, to make the determination, the system may analyze the sensor data to determine that the user is still in possession of the item(s) while exiting the facility.

In some instances, the station may include one or more additional mechanisms to help the user when selecting item(s). For example, the station may include a bag loading station located above the weight sensor, where the user is able to place the item(s) within a bag. When the item(s) are located within the bag, the bottom of the bag may be in contact with the weight sensor such that the weight sensor is able to determine the total weight of the item(s) located within the bag. In some examples, the weight sensor and/or the electronic device may be capable of determining the total weight of the item(s) by ignoring the weight of the bag. When the user is finished placing item(s) within the bag and/or the bag is full of item(s), the user may remove the bag from the bag loading station. This may cause the electronic device to determine that the user is finished loading the bag with item(s). Additionally, if the user has additional item(s), the user may use additional bag(s) for the additional item(s) until the user is finished loading item(s).

Although the above examples describe the user as removing the item(s) from the inventory location and placing the item(s) on the weight sensor, in other examples, an associate of the facility may remove the item(s) from the inventory location and/or place the item(s) on the weight sensor. For example, such as in an assisted shopping experience, the user may ask the associate for a given quantity of the item(s) and/or a given weight of the item(s). The associate may then remove the item(s) from the inventory location and place the item(s) on the weight sensor. In some instances, the system may perform similar processes as those described above (e.g., analyzing sensor data) to identify the item(s). In some instances, the associate may input the identity(ies) of the item(s) into the electronic device, similar to the user described above.

The electronic device may then determine the weight of the item(s) and the total price of the item(s) based at least in part on the weight and the price per unit weight. Additionally, the electronic device may determine that the associate is finished placing the item(s) on the weight sensor, using similar processes as those described above. Once finished, the electronic device may send the data representing the order to the system. Additionally, the user may take the item(s) from the weight sensor and/or the associate. The system may then use one or more of the processes described above to confirm that the user made the order for the item(s).

For example, the system may analyze sensor data to determine that the user was positioned around the station and/or the associate at the time of the order.

In some instances, such as when the associate is weighing the item(s), the associate may be pre-packaging item(s) for users. In such instances, the associate may place the item(s) in a package after weighing the item(s). The electronic device (and/or another device included with the station) may print a tag that is placed on package, where the tag indicates the identity(ies) of the item(s), the weight of the item(s), the price per unit weight of the item(s), the price of the item(s), and/or the like. In some instances, the tag may further include a unique identifier (e.g., code) associated with the package. After printing the tag, the associate can place the tag on the package that includes the item(s). The associate may then place the package in an inventory location associated with the item(s).

The system may then analyze sensor data to determine that a user located within the facility removes the package from the inventory location. In some instances, the system determines that the user removes the package based at least in part on analyzing the sensor data to determine that the sensor data represents the unique identifier. After the determination, the system may again associate an order for the package with the account of the user.

In some instances, a user may remove item(s) from an inventory location and not place the item(s) on a weight sensor of a station. In such instances, the system may use one or more other techniques to charge the user for the item(s). For a first example, the system may analyze sensor data to determine the identity(ies) of the item(s) and/or the number of item(s) removed from the inventory location. The system may then use a price per item to determine a total price for the item(s) (e.g., the total number of time multiplied by the price per item) and associate the order, which includes the total price, with the account of the user. For a second example, the facility may include one or more containers for the item(s), where each container is associated with a respective size (e.g., volume) and a respective price. In such an example, the system may analyze sensor data to determine which container the user is using for the item(s). The system may then determine the price for the container and associate the order, which includes the price of the container, with the account of the user.

Upon finishing his or her shopping, the user may approach the AC exit location and, in some instances, scan or otherwise provide identifying information to enable the system to identify the exiting user. After scanning his or her unique code at the AC exit location, for instance, the user may exit the facility. The system, meanwhile, may thereafter charge an account of the identified exiting user for a price of the items procured by the user within the facility. Of course, while the above example describes the user scanning a unique code (e.g., via a mobile device of the user), it is to be appreciated that the exiting user may be identified based at least in part on other sensor data, such as image data, voice data, or the like.

While some of the examples below are described with reference to a materials handling facility (e.g., a brick-and-mortar retail store, a fulfillment center, etc.), the systems and techniques may be implemented for detecting events in any type of facility, an airport, a classroom, an outdoor environment, an amusement park, or any other location. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-1E collectively illustrate an example facility 100 associated with a system for enabling automated checkout (AC) techniques to allow users, such as an example user 102, to enter the facility 100, order and/or pick one or more items, and exit the facility without performing a manual checkout of the items. To do so, the system coupled to the environment may identify a user and charge an account associated with the user for a cost of the ordered and/or picked items upon exit of the user.

As illustrated in FIGS. 1A-1E, the example facility 100 includes an AC entry location 104 and an AC exit location 106. The example facility 100 also includes a station 108 and inventory locations 110(1)-(2) (also referred to as "inventory locations 110"). In some examples, the facility 100 may also include devices 112(1)-(4) (also referred to as "devices 112"), which may include various types of scanning devices and/or electronic devices to help facilitate AC techniques, which will be described in more detail below. The facility 100 may also include sensors 114(1)-(8) (also referred to as "sensors 114"). As suggested above, the sensors 114 may include cameras, microphones, weight sensors, and/or the like to help facilitate AC techniques. In general, the devices 112 and/or the sensors 114 may be associated with the AC entry locations 104, the AC exit locations 106, the stations 108, and/or the inventory locations 110. Various example AC scenarios will now be described with reference to the example facility 100 shown in FIGS. 1A-1E.

Referring to FIG. 1A, the AC entry location 104 (e.g., entry gate) may request that entering users provide identifying information prior to entering the facility 100. In the illustrated example, the user 102 enters through the AC entry location 104 by scanning a unique code presented on a mobile device 116 of the user 102, such as at a scanning device 112(1) at the AC entry location 104. The scanning device 112(1) may provide this information to a system, such as an inventory management system discussed in following figures, which may use this information for identifying the entering user 102. Of course, while this example describes identifying the user 102 based at least in part on the user 102 scanning an unique code presented on the mobile device 116, the system may additionally, or alternatively, identify the user 102 based on voice data (e.g., the user 102 stating his or her name), image data (e.g., image data of a face of the user 102), password data (e.g., an alphanumeric string), credit card data, and/or any other type of data. For instance, the system may identify the user 102 based on data provided by sensor 114(1), or based on credit card data provided by device 112(1). In some examples, those users that have consented/requested to take part in the AC techniques may be identified, while the system may refrain from identifying other users entering the facility 100. As suggested above, in some examples a facility may not have specified entry locations or gates.

In the scenario illustrated in FIG. 1A, upon the user 102 entering the facility 100 via the AC entry location 104 at a first time ($T_1$), the system generates a record indicating the presence of the identified user 102 within the facility 100. This record may be continuously or periodically updated by a locating component of the system to generate current location data of the user 102 within the facility 100, at the prior consent/request of the user 102. In some instances, the sensors 114, such as overhead cameras or the like, may be used to determine a current location of the user 102. In addition, the record generated by the system at T₁ may indicate whether the user 102 is eligible to engage in the AC techniques provided by the facility 100. For example, the record may indicate whether the user 102 is able to "just walk out" with any items he or she collects within the facility 100 without first performing a manual checkout for the items. In this example, at least in part because the system has identified the user 102, the user 102 is eligible at T₁ to exit the facility 100 with item(s) without performing manual checkout of the items.

In some instances, the system may, additionally or alternatively to the user 102 being identified, store an indication that the user 102 is eligible to exit the facility without performing manual checkout of the items based on the user being associated with a payment instrument. For example, upon identifying the user 102 entering the facility 100, the system may identify an account of the user 102 and may determine whether the account is associated with a valid payment instrument. If so, then the system may store an indication that the user 102 is eligible to exit the facility 100 with one or more items without performing a manual checkout of the items. In another example, the entering user 102 may swipe, scan, or otherwise provide identifying information associated with a payment instrument (e.g., credit card) of the user 102 upon entering the facility 100. The system may use this identifying information to determine whether the payment instrument is valid (potentially along with a limit of the payment instrument) and may store an indication that the user 102 is eligible to exit the facility 100 without performing manual checkout of the items (assuming the total of the items is less than the limit). In these instances, the system may or may not identify the user 102 but may instead simply associate the user 102 in the facility 100 with the identified payment instrument. In yet another example, the AC exit location 106 may include a device 112 configured to accept cash, such that the user 102 may input a certain amount of cash and remain eligible for exiting the facility 100 without performing a manual checkout exit, so long as the user 102 does not obtain items having a cumulative value (e.g., with taxes, etc.) that exceeds the amount of inserted cash.

Returning to the scenario of FIG. 1A, in this example the user 102 enters the facility 100 and proceeds to the inventory location 110(1). As such, and at a second time (T₂), the user 102 removes a number of items 118 from the inventory location 110(1). The system may receive sensor data, such as image data generated by the sensor 114(2) located proximate to the inventory location 110(1). In some instances, the system may then analyze the sensor data to determine that the sensor data represents the user 102 removing the items 118 from the inventory location 110(1). However, in other examples, the system may use other types of sensor data to identify the items 118 being removed by the user 102. For example, the system may use sensor data from a weight sensor located within the inventory location 110(1), where the sensor data indicates that the items 118 were removed from the inventory location 110(1) when the user 102 was positioned around the inventory location 110(1).

At a third time (T₃), the user 102 may proceed to the station 108 in order to weigh the items 118 removed from the inventory location 110(1) and determine the price of the items 118. The device 112(2) associated with the station 108 may determine an identity of the items 118 being placed on the sensor 114(6), which may include a weight sensor. In some examples, to determine the identity, the system may send an identifier of the items 118 to the device 112(2). This may occur when the system previously analyzes the sensor data to identify the items 118 removed by the user 102 from the inventory location 110(1). In some instances, the system may determine that the user 102 is positioned around the station 108 before sending the identifier. For example, the system may receive sensor data from the sensor 114(3) located proximate to the station 108. The system may then analyze the sensor data to determine that the user 102 is poisoned around the station 108.

Additionally, or alternatively, in some examples, to determine the identity, the user 102 may manually input the identifier into the device 112(2). For a first example, the device 112(2) may provide a user interface that includes identities of items that are provided at the facility 100. The device 112(2) may then receive input from the user 102 selecting the identifier of the items 118. For a second example, the items 118 may be associated with a tag. The device 112(2) may then receive an input from the user 102 representing the tag and then identify the items 118 based on the input. Still, for a third example, and again if the items 118 include a tag, the device 112(2) may include a scanner that scans information from the tag that the device 112(2) then uses to identify the items 118.

The device 112(2) may also receive sensor data from the sensor 114(6) that indicates the weight of the items 118. The device 112(2) may then use the weight of the items 118 along with the price per unit weight associated with the items 118 to determine the price of the items 118. In some examples, the device 112(2) stores data indicating the price per unit weight of the items 118 and uses the data to determine the price of the items 118. In some examples, the system may send data to the device 112(2) that indicates the price per unit weight of the items 118, which the device 112(2) may then use to determine the price of the items 118. In either example, after determining the price, the device 112(2) may send, to the system, data representing the order. For instance, the data may indicate at least the identifier of the items 118, the weight of the items 118, the price per unit weight of the items 118, and the price of the items 118. In some instances, the device 112(2) sends the data to the system after determining that the order is complete. For example, the device 112(2) may send the data after the items 118 are removed from the sensor 114(6) and/or after receiving input from the user 102 indicating that the order is complete.

In some instances, before associating the order with the account of the user 102, the system may determine that the user is removing the items 118. For a first example, the system may analyze sensor data generated by a sensor 114 to determine that the user 102 has left an area proximate to the inventory location 110(1) and/or the station 108 while still in possession of the items 118. For a second example, the system may analyze sensor data generated by a sensor 114 to determine that the user 102 has placed the items 118 in a tote.

At a fourth time (T₄), in this example, the user 102 exits the facility 100 at the AC exit location 106 by, for example, providing identifying information, or by simply exiting the facility 100 without scanning or providing identifying information. For example, similar to the AC entry location 104, the AC exit location 106 (e.g., exit gate) may include a device 112(4) that enables the user 102 to scan a unique code from his or her mobile phone 116, or provide any other type of identifying information. In still other instances, the user 102 may walk out and the system may identify the user 102 via facial-recognition techniques using data from sensor 114(5), for example. In such instances, the user 102 may have requested and/or given permission for such automatic recognition techniques. As noted above, in some examples a facility may not have specified exit locations or gates.

In response to the user 102 attempting to exit the facility 100, the system may identify the record associated with the user 102, determine that the user 102 is eligible to "just walk out", and end a shopping session of the user 102. At a fifth time ($T_5$), the system may then process a corresponding transaction, such as charging an account (e.g., a payment instrument, an account previously associated at the system, etc.) of the user 102 for the price of the items 118 listed on the virtual cart of the user 102. The transaction processing may also include supplying a notification and/or receipt or other record of the transaction to the user 102, such as on their mobile device 116. Note that the facility also may offer the user 102 a selection of methods to pay upon exit. For instance, the user may be able to select, via the device 112(4), the mobile device 116, or another device, to pay with cash or another form of payment instead of the payment instrument that was selected by the system. The user 102 may make this selection at any time, including a time prior to exit from the facility.

Although no illustrated in the example of FIG. 1A, the user 102 may place the items 118 in a bag (which is illustrated at time ($T_5$)) before placing the items 118 on the sensor 114(6). In such instances, the sensor 114(6) may be configured to ignore the weight of the bag when weighing the items 118. This way, the price of the items 118 is not determined using the weight of the bag.

Additionally, in some instances, the user 102 may provide additional information when at the facility 100, which the system may use to send feedback, such as a notification and/or receipt, to the user 102. For instance, the user 102 may input an email address associated with the user 102 into one or more of the devices 112. The system may then use the email to send the user 102 the feedback.

Figure 1B:
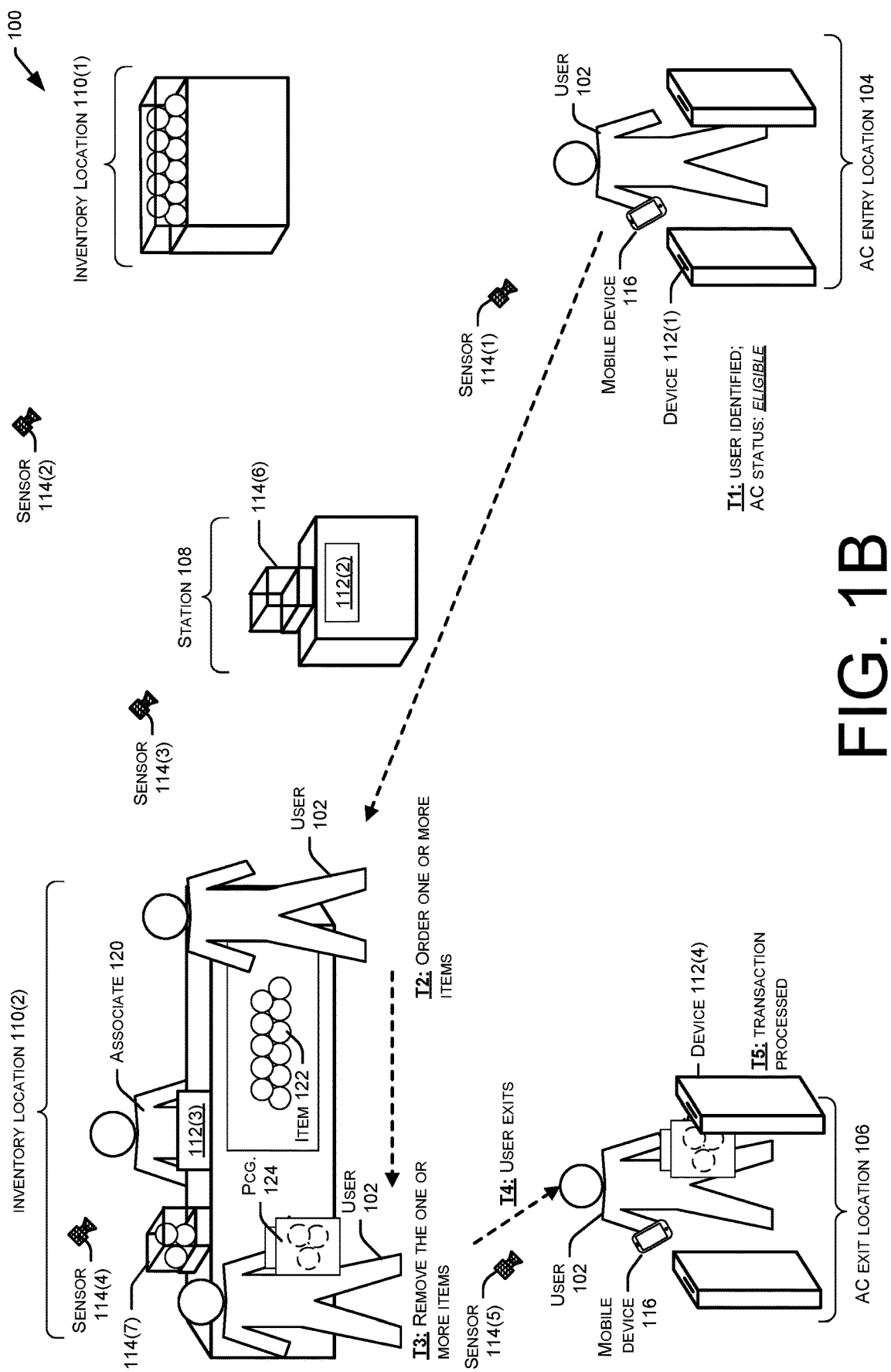
FIG. 1B illustrates the example facility associated with the system for enabling automated checkout (AC) techniques that also allow users to enter the facility, order items from an associate, and exit the facility without performing a manual checkout of the items. To do so, the system coupled to the environment may identify an entering user and charge an account associated with the user for a price of the ordered items upon exit of the user.

Referring now to FIG. 1B, upon the user 102 entering the facility 100 via the AC entry location 104 at a first time ($T_1$), the system generates a record indicating the presence of the identified user 102 within the facility 100. This record may be continuously or periodically updated by a locating component of the system to generate current location data of the user 102 within the facility 100, at the prior consent/request of the user 102. In some instances, the sensors 114, such as overhead cameras or the like, may be used to determine a current location of the user 102. In addition, the record generated by the system at $T_1$ may indicate whether the user 102 is eligible to engage in the AC techniques provided by the facility 100. For example, the record may indicate whether the user 102 is able to "just walk out" with any items he or she collects within the facility 100 without first performing a manual checkout for the items. In this example, at least in part because the system has identified the user 102, the user 102 is eligible at $T_1$ to exit the facility 100 with item(s) without performing manual checkout of the items.

In some instances, the system may, additionally or alternatively to the user 102 being identified, store an indication that the user 102 is eligible to exit the facility 100 without performing manual checkout of the items based on the user 102 being associated with a payment instrument. For example, upon identifying the user 102 entering the facility 100, the system may identify an account of the user 102 and may determine whether the account is associated with a valid payment instrument. If so, then the system may store an indication that the user 102 is eligible to exit the facility 100 with one or more items without performing a manual checkout of the items. In another example, the entering user 102 may swipe, scan, or otherwise provide identifying information associated with a payment instrument (e.g., credit card) of the user 102 upon entering the facility 100. The system may use this identifying information to determine whether the payment instrument is valid (potentially along with a limit of the payment instrument) and may store an indication that the user 102 is eligible to exit the facility 100 without performing manual checkout of the items (assuming the total of the items is less than the limit). In these instances, the system may or may not identify the user 102 but may instead simply associate the user 102 in the facility 100 with the identified payment instrument. In yet another example, the AC exit location 106 may include a device 112 configured to accept cash, such that the user 102 may input a certain amount of cash and remain eligible for exiting the facility 100 without performing a manual checkout exit, so long as the user 102 does not obtain items having a cumulative value (e.g., with taxes, etc.) that exceeds the amount of inserted cash.

Returning to the scenario of FIG. 1B, in this example, the user 102 enters the facility 100 and proceeds to the inventory location 110(2). As such, and at a second time ($T_2$), the user 102 orders items 122 from an associate 120 at the facility 100. The associate 120 may then remove the items 122 and place the items 122 on the sensor 114(7). In some examples, the system may receive sensor data, such as image data generated by the sensor 114(4) located proximate to the inventory location 110(2). The system may then analyze the sensor data to determine that the sensor data represents the associate 120 removing the items 122 and/or placing the items 122 on the sensor 114(7). However, in other examples, the system may use other types of sensor data to identify the items 122 being removed by the associate 120. For example, the system may use sensor data from a weight sensor located within the inventory location 110(2), where the sensor data indicates that the items 122 were removed from the inventory location 110(2) when the user 102 and/or the associate 120 were positioned around the inventory location 110(2).

The device 112(3) associated with the inventory location 110(2) may determine an identity of the items 122 being placed on the sensor 114(7), which may include a weight sensor. In some examples, to determine the identity, the system may send an identifier associated with the items 122 to the device 112(3). This may occur when the system previously analyzes the sensor data to identify the items 122 removed by the associate 120 and/or the identity of the items 122 being placed on the sensor 114(7). Additionally, or alternatively, in some examples, to determine the identity, the associate 120 may manually input the identifier into the device 112(3). In either example, the device 112(3) may display, to the user 102, the identity of the items 122 that were placed on the sensor 114(7) and/or the price per unit weight of the items 122.

The device 112(3) may also receive sensor data from the sensor 114(7) that indicates the weight of the items 122. The device 112(3) may then use the weight of the items 122 along with the price per unit weight associated with the items 122 to determine the price of the items 122. In some examples, the device 112(3) stores data indicating the price per unit weight of the items 122 and uses the data to determine the price of the items 122. In some examples, the system may send data to the device 112(3) that indicates the price per unit weight of the items 122, which the device 112(3) may then use to determine the price of the items 122. In either example, after determining the price, the device 112(3) may display the weight of the items 122 located on the sensor 114(7) and/or the price of the items 122. Additionally, the device 112(3) may continuously and/or periodically update the weight and/or the price as the associate 120 removes the items 122 or places the items 122 on the sensor 114(7).

The device 112(3) may also send, to the system, data representing the order. For instance, the data may indicate at least the identity of the items 122, the weight of the items 122, the price per unit weight of the items 122, and the price of the items 122. In some instances, the device 112(3) sends the data representing the order to the system after determining that the order is complete. For example, the device 112(3) may send the data after the items 122 are removed from the sensor 114(7) and/or after receiving input from the associate 120 indicating that the order is complete.

At a third time ($T_3$), the user 102 may remove the items 122, such as by having the associate provide the items 122 to the user 102. In some examples, before providing the items 122, the associate 120 places the items 122 in a package 124. In such instances, the associate 120 may further place a tag on the package 124, where the tag indicates the identity of the items 122, the weight of the items 122, the price per unit weight of the items 122, and the price of the items 122. The user 102 may then take the package 124 that includes the items 122 from the associate 120.

At a fourth time ($T_4$), in this example, the user 102 exits the facility 100 at the AC exit location 106 by, for example, providing identifying information, or by simply exiting the facility 100 without scanning or providing identifying information. For example, similar to the AC entry location 104, the AC exit location 106 (e.g., exit gate) may include a device 112(4) that enables the user 102 to scan a unique code from his or her mobile phone 116, or provide any other type of identifying information. In still other instances, the user 102 may walk out and the system may identify the user 102 via facial-recognition techniques using data from the sensor 114(5), for example. In such instances the user 102 may have requested and/or given permission for such automatic recognition techniques. As noted above, in some examples a facility may not have specified exit locations or gates.

In response to the user 102 attempting to exit the facility 100, the system may identify the record associated with the user 102, determine that the user 102 is eligible to "just walk out", and end a shopping session of the user 102. At a fifth time ($T_5$), the system may then process a corresponding transaction, such as charging an account (e.g., a payment instrument, an account previously associated at the system, etc.) of the user 102 for the price of the items 122 listed on the virtual cart of the user 102. The transaction processing may also include supplying a notification and/or receipt or other record of the transaction to the user 102, such as on their mobile device 116. Note that the facility also may offer the user 102 a selection of methods to pay upon exit. For instance, the user may be able to select, via the device 112(4), the mobile device 116, or another device, to pay with cash or another form of payment instead of the payment instrument that was selected by the system. The user 102 may make this selection at any time, including a time prior to exit from the facility.

For an example of FIG. 1B, the user 102 may approach a meat counter (e.g., the inventory location 110(2)) in order to order three steaks (e.g., the items 122) that are priced per unit weight. As such, the user 102 may ask the associate 120 for the three steaks. In response, the associate 120 may remove the three steaks and place the steaks on the sensor 144(7). As such, the device 112(3) may receive the sensor data from the sensor 114(7) that indicates the weight of the three steaks. The device 112(3) may then determine the price of the three steaks and display at least the total weight of the three steaks and the total price of the three steaks to the user 102.

The associate 120 may then give the three steaks to the user 102. At around this time, the system may receive data from the device 112(3), where the data indicates the total weight of the three steaks and the total price of the three steaks. The system may also receive image data generated by the sensor 114(4) and analyze the image data to determine that the associate 120 removed the three steaks and then placed the three steaks on the sensor 114(7). Because of this, the system may determine that the items being removed were the three steaks. Additionally, in some instances, the system may analyze the image data to determine that the user 102 was located proximate to the meat counter at the time that the three steaks were removed and/or the time the three steaks were placed on the sensor 114(7). In some instances, the system may further analyze the image data to determine that the user 102 received the three steaks from the associate 120.

Based on determining that the user 102 was located proximate to the meat counter and/or received the three steaks from the associate 120, the system may determine that the three steaks are to be associated with the user 102. As such, the system may store event data in association with an account of the user, where the event data indicates at least the total weight of the three steaks and the total price of the three steaks. In other words, the system may automatically charge the user 102 for the steaks.

Figure 1C:
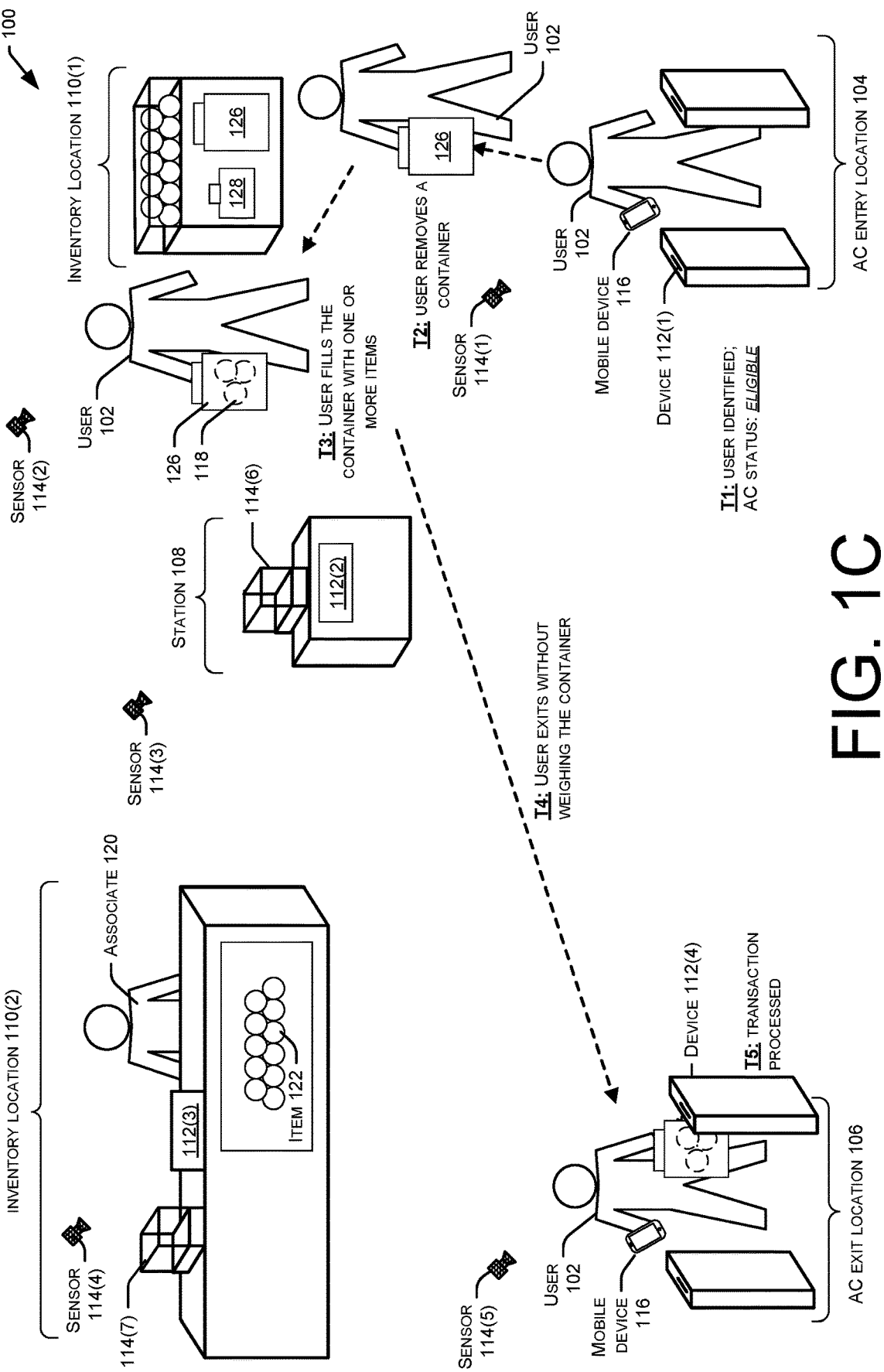
FIG. 1C illustrates the example facility associated with the system for enabling automated-checkout (AC) techniques that also allow users to enter the facility, fill a container with items, and exit the facility without performing a manual checkout of the items. To do so, the system coupled to the environment may identify an entering user and charge an account associated with the user for a price of the ordered items upon exit of the user.

Referring to FIG. 1C, upon the user 102 entering the facility 100 via the AC entry location 104 at a first time ($T_1$), the system generates a record indicating the presence of the identified user 102 within the facility 100. This record may be continuously or periodically updated by a locating component of the system to generate current location data of the user 102 within the facility 100, at the prior consent/request of the user 102. In some instances, the sensors 114, such as overhead cameras or the like, may be used to determine a current location of the user 102. In addition, the record generated by the system at $T_1$ may indicate whether the user 102 is eligible to engage in the AC techniques provided by the facility 100. For example, the record may indicate whether the user 102 is able to "just walk out" with any items he or she collects within the facility 100 without first performing a manual checkout for the items. In this example, at least in part because the system has identified the user 102, the user 102 is eligible at $T_1$ to exit the facility 100 with item(s) without performing manual checkout of the items.

In some instances, the system may, additionally or alternatively to the user 102 being identified, store an indication that the user 102 is eligible to exit the facility without performing manual checkout of the items based on the user 102 being associated with a payment instrument. For example, upon identifying the user 102 entering the facility 100, the system may identify an account of the user 102 and may determine whether the account is associated with a valid payment instrument. If so, then the system may store an indication that the user 102 is eligible to exit the facility 100 with one or more items without performing a manual checkout of the items. In another example, the entering user 102 may swipe, scan, or otherwise provide identifying information associated with a payment instrument (e.g., credit card) of the user upon entering the facility 100. The system may use this identifying information to determine whether the payment instrument is valid (potentially along with a limit of the payment instrument) and may store an indication that the user 102 is eligible to exit the facility 100 without performing manual checkout of the items (assuming the total of the items is less than the limit). In these instances, the system may or may not identify the user 102 but may instead simply associate the user 102 in the facility 100 with the identified payment instrument. In yet another example, the AC exit location 106 may include a device 112 configured to accept cash, such that the user 102 may input a certain amount of cash and remain eligible for exiting the facility 100 without performing a manual checkout exit, so long as the user 102 does not obtain items having a cumulative value (e.g., with taxes, etc.) that exceeds the amount of inserted cash.

Returning to the scenario of FIG. 1C, in this example, the user 102 enters the facility 100 and proceeds to the inventory location 110(1). As such, and at a second time ($T_2$), the user 102 removes a container 126 associated with the inventory location 110(1). The system may receive sensor data, such as image data generated by the sensor 114(2) located proximate to the inventory location 110(1). In some instances, the system may then analyze the sensor data to determine that the sensor data represents the user 102 removing the container 126 from the inventory location 110(1). However, in other examples, the system may use other types of sensor data to identify the container 126 being removed by the user 102. For example, the system may use sensor data from a weight sensor located within the inventory location 110(1), where the sensor data indicates that the container 126 was removed from the inventory location 110(1) when the user 102 was positioned around the inventory location 110(1).

At a third time ($T_3$), the user 102 may fill the container 126 with items 118 located at the inventory location 110(1). In some instances, the system may analyze sensor data generated by the sensor 114(2) to determine that the user 102 is filling the container 126 and/or determine an identity of the items 118 that the user 102 is using to fill the container 126. In some instances, the system may analyze sensor data generated by one or more other sensors, such as weight sensors located within the inventory location 110(1), to determine that the user 102 is filling the container 126 with items and/or determine the identity of the items 118.

At a fourth time ($T_4$), in this example, the user 102 exits the facility 100 without weighing the container 126 using the station 108. In some examples, based on the user 102 exiting the facility 100 without weighing the container 126, the system may determine a price for the items 118 that is based on the container 126. For example, the inventory location 110(1) may include one or more containers for the item 118, such as the container 126 and another container 128, where each container is associated with a respective size (e.g., volume) and a respective price. For example, the container 126 may be associated with a first price and the container 128 may be associated with a second, different price. In such an example, the system may determine that the price of the items 118 includes the price of the container 126.

Additionally, or alternatively, in some examples, and again based on the user 102 exiting the facility 100 without weighing the container 126, the system may use a price per unit to determine the price of the items 118. For instance, if the system determines that the user 102 put three of the items 118 within the container 126, the system may determine a price for three of the items 118. In either example, the system is able to determine a price for charging the user 102 when the user 102 uses the station 108 to weigh the items 118 (and/or the container 126 and items 118) and when the user 102 does not use the station 108 to weigh the items. In such examples, the inventory location 110(1) may include a sign, tag, and/or other visual that provides information notifying users that the user will be charged the weighted price if the users use the station 108 to weigh the items 118 and be charged the container price and/or per item price if the users do not use the station 108 to weigh the items 118.

Additionally, the user 102 may exit the facility 100, at the AC exit location 106 by, for example, providing identifying information, or by simply exiting the facility 100 without scanning or providing identifying information. For example, similar to the AC entry location 104, the AC exit location 106 (e.g., exit gate) may include the device 112(4) that enables the user 102 to scan a unique code from his or her mobile phone 116, or provide any other type of identifying information. In still other instances, the user 102 may walk out and the system may identify the user 102 via facial-recognition techniques using data from the sensor 114(5), for example. In such instances, the user 102 may have requested and/or given permission for such automatic recognition techniques. As noted above, in some examples a facility may not have specified exit locations or gates.

In response to the user 102 attempting to exit the facility 100, the system may identify the record associated with the user 102, determine that the user 102 is eligible to "just walk out", and end a shopping session of the user 102. At a fifth time ($T_5$), the system may then process a corresponding transaction, such as charging an account (e.g., a payment instrument, an account previously associated at the system, etc.) of the user 102 for the price of the items 118 (e.g., the price of the container 126 in the example of FIG. 1C) listed on the virtual cart of the user 102. The transaction processing may also include supplying a notification and/or receipt or other record of the transaction to the user 102, such as on their mobile device 116. Note that the facility also may offer the user 102 a selection of methods to pay upon exit. For instance, the user 102 may be able to select, via the device 112(4), the mobile device 116, or another device, to pay with cash or another form of payment instead of the payment instrument that was selected by the system. The user 102 may make this selection at any time, including a time prior to exit from the facility. The user 102 may also choose to complete their transaction with an associate at the facility 100, for instance.

Figure 1D:
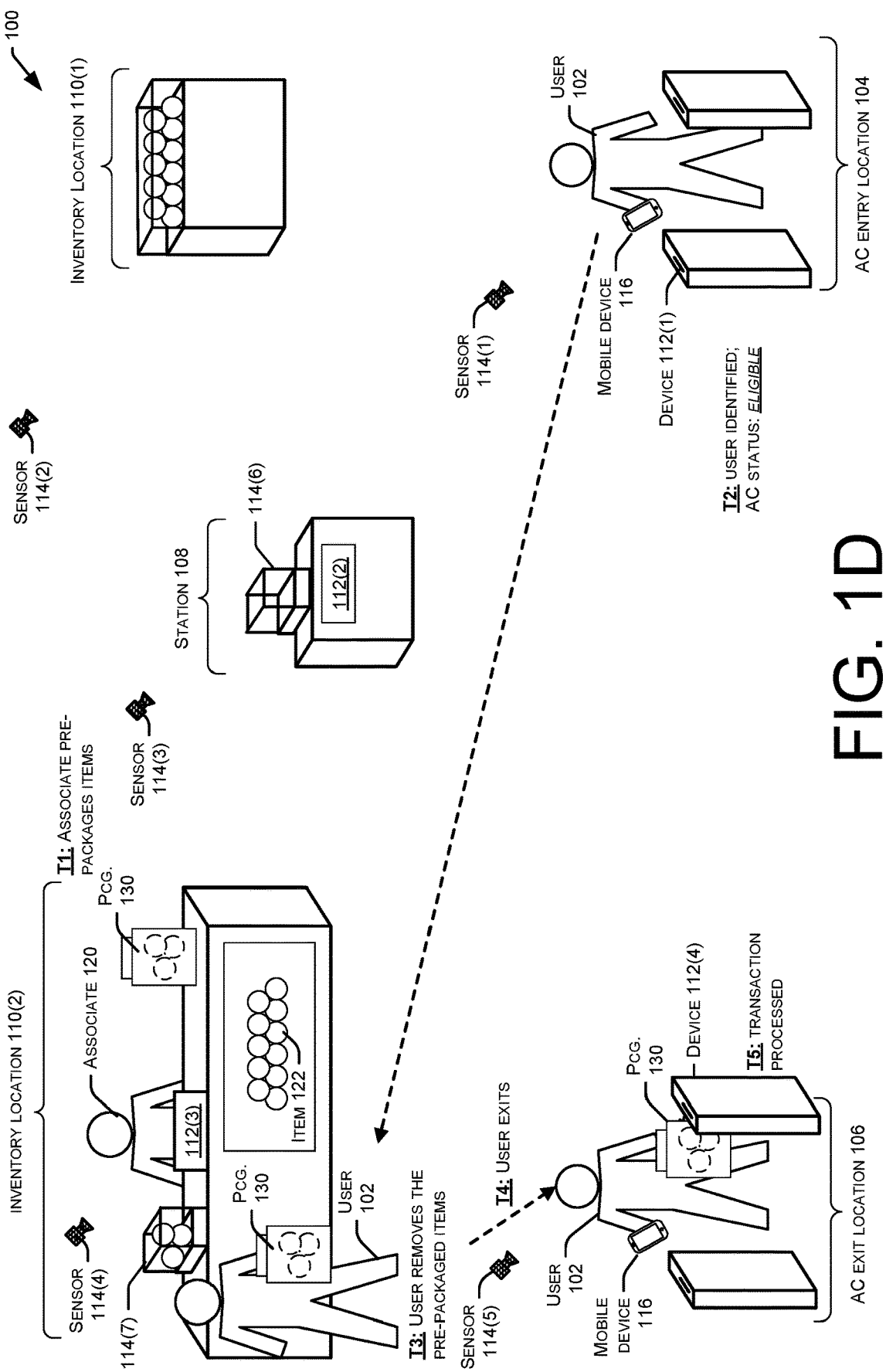
FIG. 1D illustrates the example facility associated with the system for enabling automated checkout (AC) techniques that also allow users to enter the facility, remove items that were pre-packaged by an associate, and exit the facility without performing a manual checkout of the items. To do so, the system coupled to the environment may identify an entering user and charge an account associated with the user for a price of the pre-package upon exit of the user.

Referring to FIG. 1D, a first time ($T_1$), the associate 120 may pre-package the items 122 by initially weighing the items 122 using the sensor 114(7). After weighing the items 122, the associate 120 may place the items 122 in a package 130. Additionally, the device 112(3) (and/or another device) may print a tag associated with the package 130. For example, the tag may include an identifier of the package 130, an identifier of the items 122, a price per unit weight of the items 122, a weight of the items 122, a price of the items 122, and/or the like. In some instances, the identifier of the package 130 is unique to that package 130 since the items 122 located within the package 130 are priced per unit weight. As such, if more than one package includes the items 122, each package may include a unique price and as such, a unique identifier. The associate 120 may then place the package 130 at the inventory location 110(2) for users.

In some instances, the user 102 may preorder the items 122 from the facility 100. For instance, using an electronic device, such as the mobile phone 116, the user 102 may input the order for the items 122, either before and/or after entering the facility 100. The system may receive the order and then send the order to the associate 120 (e.g., send data representing the order to the device 112(3) and/or another device). The associate 120 may then package the order for the user 102 before the user arrives at the inventory location 110(2), which is described below.

Next, upon the user 102 entering the facility 100 via the AC entry location 104 at a second time ($T_2$), the system generates a record indicating the presence of the identified user 102 within the facility 100. This record may be continuously or periodically updated by a locating component of the system to generate current location data of the user 102 within the facility 100, at the prior consent/request of the user 102. In some instances, the sensors 114, such as overhead cameras or the like, may be used to determine a current location of the user 102. In addition, the record generated by the system at $T_2$ may indicate whether the user 102 is eligible to engage in the AC techniques provided by the facility 100. For example, the record may indicate whether the user 102 is able to "just walk out" with any items he or she collects within the facility 100 without first performing a manual checkout for the items. In this example, at least in part because the system has identified the user 102, the user 102 is eligible at $T_2$ to exit the facility 100 with items without performing manual checkout of the items.

In some instances, the system may, additionally or alternatively to the user 102 being identified, store an indication that the user 102 is eligible to exit the facility 100 without performing manual checkout of the items based on the user 102 being associated with a payment instrument. For example, upon identifying the user 102 entering the facility 100, the system may identify an account of the user 102 and may determine whether the account is associated with a valid payment instrument. If so, then the system may store an indication that the user 102 is eligible to exit the facility 100 with one or more items without performing a manual checkout of the items. In another example, the entering user 102 may swipe, scan, or otherwise provide identifying information associated with a payment instrument (e.g., credit card) of the user 102 upon entering the facility 100. The system may use this identifying information to determine whether the payment instrument is valid (potentially along with a limit of the payment instrument) and may store an indication that the user 102 is eligible to exit the facility 100 without performing manual checkout of the items (assuming the total of the items is less than the limit). In these instances, the system may or may not identify the user 102 but may instead simply associate the user 102 in the facility 100 with the identified payment instrument. In yet another example, the AC exit location 106 may include a device 112 configured to accept cash, such that the user 102 may input a certain amount of cash and remain eligible for exiting the facility 100 without performing a manual checkout exit, so long as the user 102 does not obtain items having a cumulative value (e.g., with taxes, etc.) that exceeds the amount of inserted cash.

Returning to the scenario of FIG. 1D, in this example the user 102 enters the facility 100 and proceeds to the inventory location 110(2). As such, and at a third time ($T_3$), the user 102 removes the package 130 from the inventory location 110(1). The system may receive sensor data, such as image data generated by the sensor 114(4) located proximate to the inventory location 110(2). In some instances, the system may then analyze the sensor data to determine that the sensor data represents the user 102 removing the package 130 from the inventory location 110(2). However, in other examples, the system may use other types of sensor data to identify the package 130 being removed by the user 102. For a first example, the system may use sensor data from a weight sensor located within the inventory location 110(2), where the sensor data indicates that the package 130 was removed from the inventory location 110(2) when the user 102 was positioned around the inventory location 110(2). For a second example, the system may analyze sensor data (e.g., image data) to identify the tag and/or the identifier associated with the package 130. Based on the identification(s), the system may determine that the user 102 removed the package 130 from the inventory location 110(2).

At a fourth time ($T_4$), in this example, the user 102 exits the facility 100 with the package 130. The user 102 may exit the facility 100, at the AC exit location 106 by, for example, providing identifying information, or by simply exiting the facility 100 without scanning or providing identifying information. For example, similar to the AC entry location 104, the AC exit location 106 (e.g., exit gate) may include a device 112(4) that enables the user 102 to scan a unique code from his or her mobile phone 116, or provide any other type of identifying information. In still other instances, the user 102 may walk out and the system may identify the user 102 via facial-recognition techniques using data from the sensor 114(5), for example. In such instances user 102 may have requested and/or given permission for such automatic recognition techniques. As noted above, in some examples a facility may not have specified exit locations or gates.

In response to the user 102 attempting to exit the facility 100, the system may identify the record associated with the user 102, determine that the user 102 is eligible to "just walk out", and end a shopping session of the user 102. At a fifth time ($T_5$), the system may then process a corresponding transaction, such as charging an account (e.g., a payment instrument, an account previously associated at the system, etc.) of the user 102 for the price of the items 118 listed on the virtual cart of the user 102. The transaction processing may also include supplying a notification and/or receipt or other record of the transaction to the user 102, such as on their mobile device 116. Note that the facility also may offer the user 102 a selection of methods to pay upon exit. For instance, the user 102 may be able to select, via the device 112(4), the mobile device 116, or another device, to pay with cash or another form of payment instead of the payment instrument that was selected by the system. The user 102 may make this selection at any time, including a time prior to exit from the facility. The user 102 may also choose to complete their transaction with an associate at the facility 100, for instance.

Figure 1E:
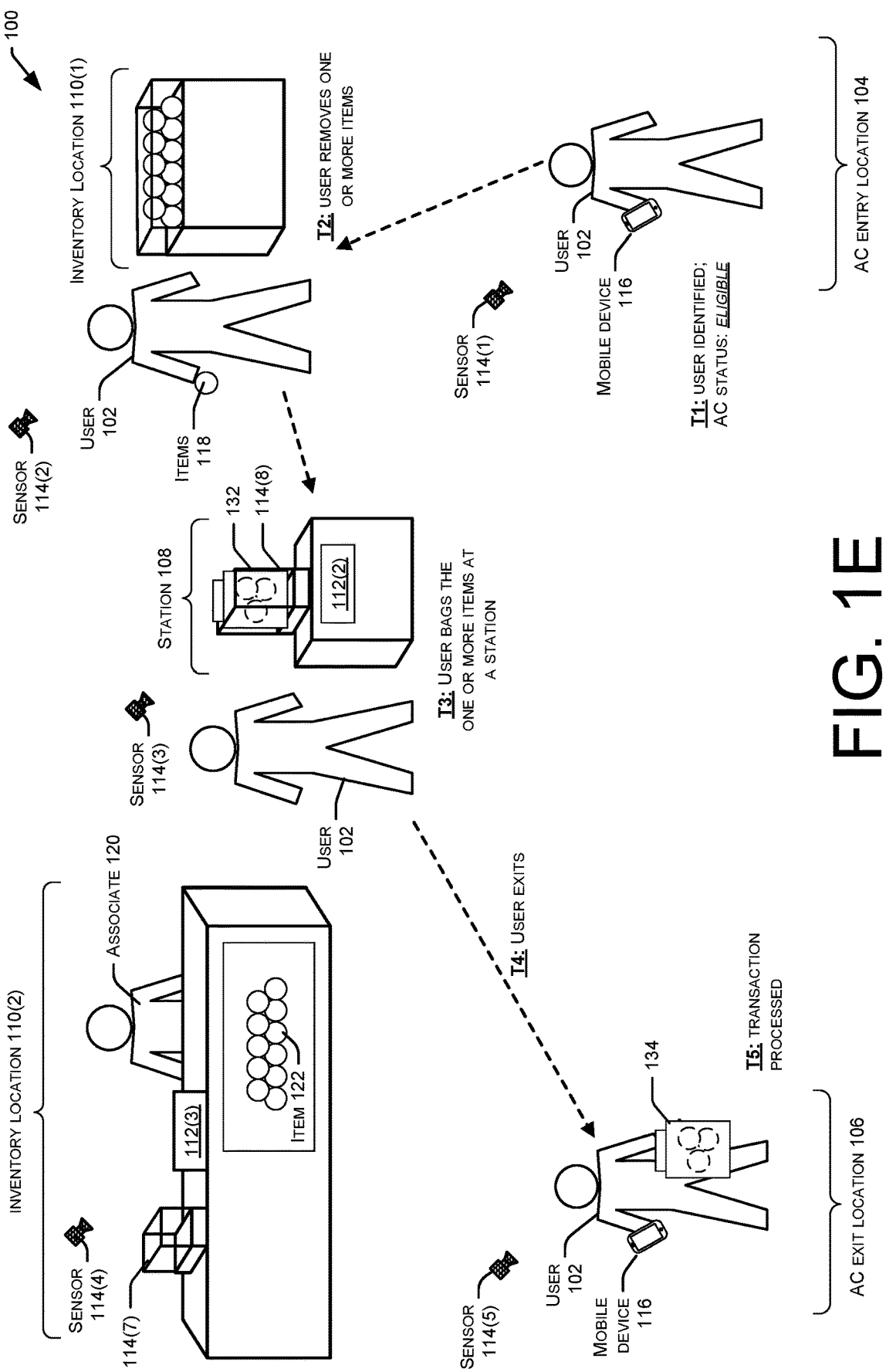
FIG. 1E illustrates the example facility associated with the system for enabling automated checkout (AC) techniques that also allow users to enter the facility, place items within a bagging station that includes a weight station for determining a price of the items, and exit the facility without performing a manual checkout of the items. To do so, the system coupled to the environment may identify an entering user and charge an account associated with the user for a price of the pre-package upon exit of the user.

Referring to FIG. 1E, upon the user 102 entering the facility 100 via the AC entry location 104 at a first time ($T_1$), the system generates a record indicating the presence of the identified user 102 within the facility 100. This record may be continuously or periodically updated by a locating component of the system to generate current location data of the user 102 within the facility 100, at the prior consent/request of the user 102. In some instances, the sensors 114, such as overhead cameras or the like, may be used to determine a current location of the user 102. In addition, the record generated by the system at $T_1$ may indicate whether the user 102 is eligible to engage in the AC techniques provided by the facility 100. For example, the record may indicate whether the user 102 is able to "just walk out" with any items he or she collects within the facility 100 without first performing a manual checkout for the items. In this example, at least in part because the system has identified the user 102, the user 102 is eligible at $T_1$ to exit the facility 100 with item(s) without performing manual checkout of the items.

In some instances, the system may, additionally or alternatively to the user 102 being identified, store an indication that the user 102 is eligible to exit the facility without performing manual checkout of the items based on the user 102 being associated with a payment instrument. For example, upon identifying the user 102 entering the facility 100, the system may identify an account of the user 102 and may determine whether the account is associated with a valid payment instrument. If so, then the system may store an indication that the user 102 is eligible to exit the facility 100 with one or more items without performing a manual checkout of the items. In another example, the entering user 102 may swipe, scan, or otherwise provide identifying information associated with a payment instrument (e.g., credit card) of the user upon entering the facility 100. The system may use this identifying information to determine whether the payment instrument is valid (potentially along with a limit of the payment instrument) and may store an indication that the user 102 is eligible to exit the facility 100 without performing manual checkout of the items (assuming the total of the items is less than the limit). In these instances, the system may or may not identify the user 102 but may instead simply associate the user 102 in the facility 100 with the identified payment instrument.

In this example, the facility 100 may not include the device 112(1) and/or the device 112(2). In some instances, one or more of the other examples 1A-1D may also not include the device 112(1) and/or the device 112(2). Rather, the user 102 is identified using other types of sensor data, such as image data generated by the sensor 114(1) and/or the sensor 114(5).

Returning to the scenario of FIG. 1E, in this example the user 102 enters the facility 100 and proceeds to the inventory location 110(1). As such, and at a second time ($T_2$), the user 102 removes a number of items 118 from the inventory location 110(1). The system may receive sensor data, such as image data generated by the sensor 114(2) located proximate to the inventory location 110(1). In some instances, the system may then analyze the sensor data to determine that the sensor data represents the user 102 removing the items 118 from the inventory location 110(1). However, in other examples, the system may use other types of sensor data to identify the items 118 being removed by the user 102. For example, the system may use sensor data from a weight sensor located within the inventory location 110(1), where the sensor data indicates that the items 118 were removed from the inventory location 110(1) when the user 102 was positioned around the inventory location 110(1).

At a third time ($T_3$), the user 102 may proceed to the station 108 in order to weigh the items 118 removed from the inventory location 110(1) and determine the price of the items 118. As shown in the example of FIG. 1E, the station 108 now includes a sensor 114(8) with a bagging station 132 located above the sensor 114(8). The bagging station 134 may include one or more bags 134. As such, the user 102 may place the items 118 within a bag 134 of the bagging station 132. When the items 118 are placed within the bag 134, the bottom of the bag 134 may contact the sensor 114(8) such that the sensor 114(8) is able to determine the weight of the items 118. In some instances, the sensor 114(8) may be configured to ignore the weight of the bag 134 when weighing the items 118.

The device 112(2) associated with the station 108 may determine an identity of the items 118 being placed on the sensor 114(8). In some examples, to determine the identity, the system may send an identifier of the items 118 to the device 112(2). This may occur when the system previously analyzes the sensor data to identify the items 118 removed by the user 102 from the inventory location 110(1). In some instances, the system may determine that the user 102 is positioned around the station 108 before sending the identifier. For example, the system may receive sensor data from the sensor 114(3) located proximate to the station 108. The system may then analyze the sensor data to determine that the user 102 is poisoned around the station 108.

Additionally, or alternatively, in some examples, to determine the identity, the user 102 may manually input the identity into the device 112(2). For a first example, the device 112(2) may provide a user interface that includes identities of items that are provided at the facility 100. The device 112(2) may then receive input from the user 102 selecting the identity of the items 118. For a second example, the items 118 may be associated with a tag. The device 112(2) may then receive an input from the user 102 representing the tag and identity then items 118 based on the input. Still, for a third example, and again if the items 118 include a tag, the device 112(2) may include a scanner that scans information from the tag that the device 112(2) then uses to identify the items 118.

The device 112(2) may also receive sensor data from the sensor 114(8) that indicates the weight of the items 118. The device 112(2) may then use the weight of the items 118 along with the price per unit weight associated with the items 118 to determine the price of the items 118. In some examples, the device 112(2) stores data indicating the price per unit weight of the items 118 and uses the data to determine the price of the items 118. In some examples, the system may send data to the device 112(2) that indicates the price per unit weight of the items 118, which the device 112(2) may then use to determine the price of the items 118. In either example, after determining the price, the device 112(2) may send, to the system, data representing the order. For instance, the data may indicate at least the identity of the items 118, the weight of the items 118, the price per unit weight of the items 118, and the price of the items 118. In some instances, the device 112(2) sends the data to the system after determining that the order is complete. For example, the device 112(2) may send the data after the bag 134 is removed from the bagging station 132 and/or after receiving input from the user 102 indicating that the order is complete.

At a fourth time ($T_4$), in this example, the user 102 exits the facility 100 at the AC exit location 106 by, for example, providing identifying information, or by simply exiting the facility 100 without scanning or providing identifying information. For example, the user 102 may walk out and the system may identify the user 102 via facial-recognition techniques using data from the sensor 114(5), for example. In such instances, the user 102 may have requested and/or given permission for such automatic recognition techniques. As noted above, in some examples a facility may not have specified exit locations or gates.

In response to the user 102 attempting to exit the facility 100, the system may identify the record associated with the user 102, determine that the user 102 is eligible to "just walk out", and end a shopping session of the user 102. At a fifth time ($T_5$), the system may then process a corresponding transaction, such as charging an account (e.g., a payment instrument, an account previously associated at the system, etc.) of the user 102 for the price of the items 118 listed on the virtual cart of the user 102. The transaction processing may also include supplying a notification and/or receipt or other record of the transaction to the user 102, such as on their mobile device 116. Note that the facility also may offer the user 102 a selection of methods to pay upon exit. For instance, the user may be able to select, via the mobile device 116, or another device, to pay with cash or another form of payment instead of the payment instrument that was selected by the system. The user 102 may make this selection at any time, including a time prior to exit from the facility.

Figure 2:
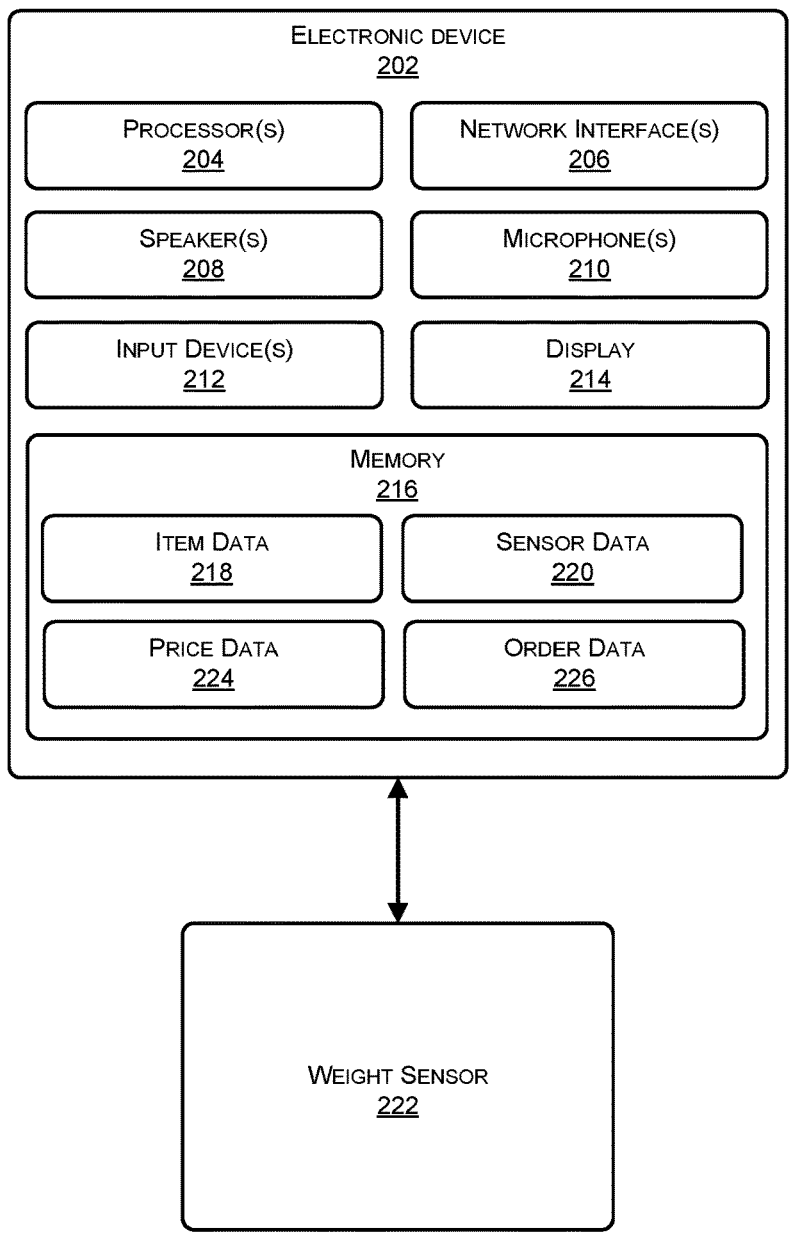
FIG. 2 illustrates a block diagram of example components that may be included in a station for weighing items.

FIG. 2 illustrates a block diagram of example components that may be included in a station (e.g., the station 108) for weighing items. As shown, the electronic device 202 includes processor(s) 204, network interface(s) 206, speaker(s) 208, microphone(s) 210, input device(s) 212, a display 214, and memory 216. In some instances, the electronic device 202 may include one or more additional components not illustrated in the example of FIG. 2. In some instances, the electronic device 202 may not include one or more of the speaker(s) 208, the microphone(s) 210, the input device(s) 212, or the display 214.

The input device(s) 212 may include button(s), key(s), joystick(s), touch-sensitive pad(s), trigger(s), sensor(s) that detect movement of the electronic device 202 (e.g., accelerometer(s), magnetometer(s), etc.), touch inputs to the display 214, and/or any other type of device that is able to receive input from the user.

The electronic device 202 may include memory 216. The memory 216 may be used to store any number of software components that are executable by the processor(s) 204. As shown, the memory 216 may store item data 218. The item data 218 may represent the identities of items that are available at a facility. As described herein, an identity may include, but is not limited to, a name, a classifier, an identifier (e.g., a numerical identifier, an alphabetic identifier, a mixed numerical and alphabetic identifier, etc.), and/or the like that identifies an item. In some instances, the electronic device 202 receives the item data 218 from the system. In some instances, the electronic device 202 receives the item data 218 at a time at which a user is positioned near the electronic device 202. Still, in some instances, the electronic device 202 receives the item data 218 based on sending a request to the system, such as when a user is weighing items.

The memory 216 may further be used to store sensor data 220 generated by a weight sensor 222. The sensor data 222 may represent the weight of one or more items that are placed on the weight sensor 222, such as by a user. In some instances, the electronic device 202 receives the sensor data 222 at given time intervals (e.g., every second, every five seconds, every minute, and/or the like). In some instances, the electronic device 202 receives the sensor data 222 each time the weight sensor detects a change in weight. Still, in some instances, the electronic device 202 receives the sensor data 222 based on requesting the sensor data 220 from the weight sensor 222.

In some instances, the memory 216 may be used to store price data 224 associated with items. The price data 224 associated with an item may represent the price per unit weight associated with the item. For example, the price data 224 associated with a type of fruit may indicate that the fruit is $1.50 per pound. In some instances, the electronic device 202 receives the price data from the system. In some instances, the electronic device 202 receives the price data 224 at a time at which a user is poisoned near the electronic device 202. Still, in some instances, the electronic device 202 receives the price data 224 based on sending a request to the system, such as when a user is weighing items.

As further illustrated in the example of FIG. 2, the memory 216 may be used to store order data 226. The order data 226 may represent orders that are placed using the electronic device 202 (e.g., using the station). For example, the order data 226 associated with an order may represent at least a time of the order, identifier(s) associated with item(s), a weight of the item(s), a price per unit weight associated with the item(s), a total price of the item(s), and/or the like. In some instances, the electronic device 202 may store the order data 226 for a given period of time (e.g., one hour, ten hours, one day, etc.). In some instances, the electronic device 202 may store the order data 226 until the electronic device 202 sends the order data 226 to the system.

In some instances, the weight sensor 222 may include a LFT commercial scale, which is tested and verified to meet national standards and/or local regulations. For instance, the National Type Evaluation Program (NTEP) may have evaluated the weight sensor 222 and issued a Certification of Conformance (CC) for the weight sensor 222. In some instances, the weight sensor 222 may include at least a top platter and base.

As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, discussed herein, may include at least one operating system (OS) component that is configured to manage hardware resource devices such as the network interface(s), the I/O devices of the respective apparatuses, and so forth, and provide various services to applications or components executing on the processors. Such OS component may implement a variant of the Free-BSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Network interface(s) may enable messages between devices, such as the electronic device 202, the weight sensor 222, and the system, as well as other networked devices. The network interface(s) may include one or more network interface controllers (NICs) or other types of transceiver devices to send and receive messages over network(s). For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

Figure 3A:
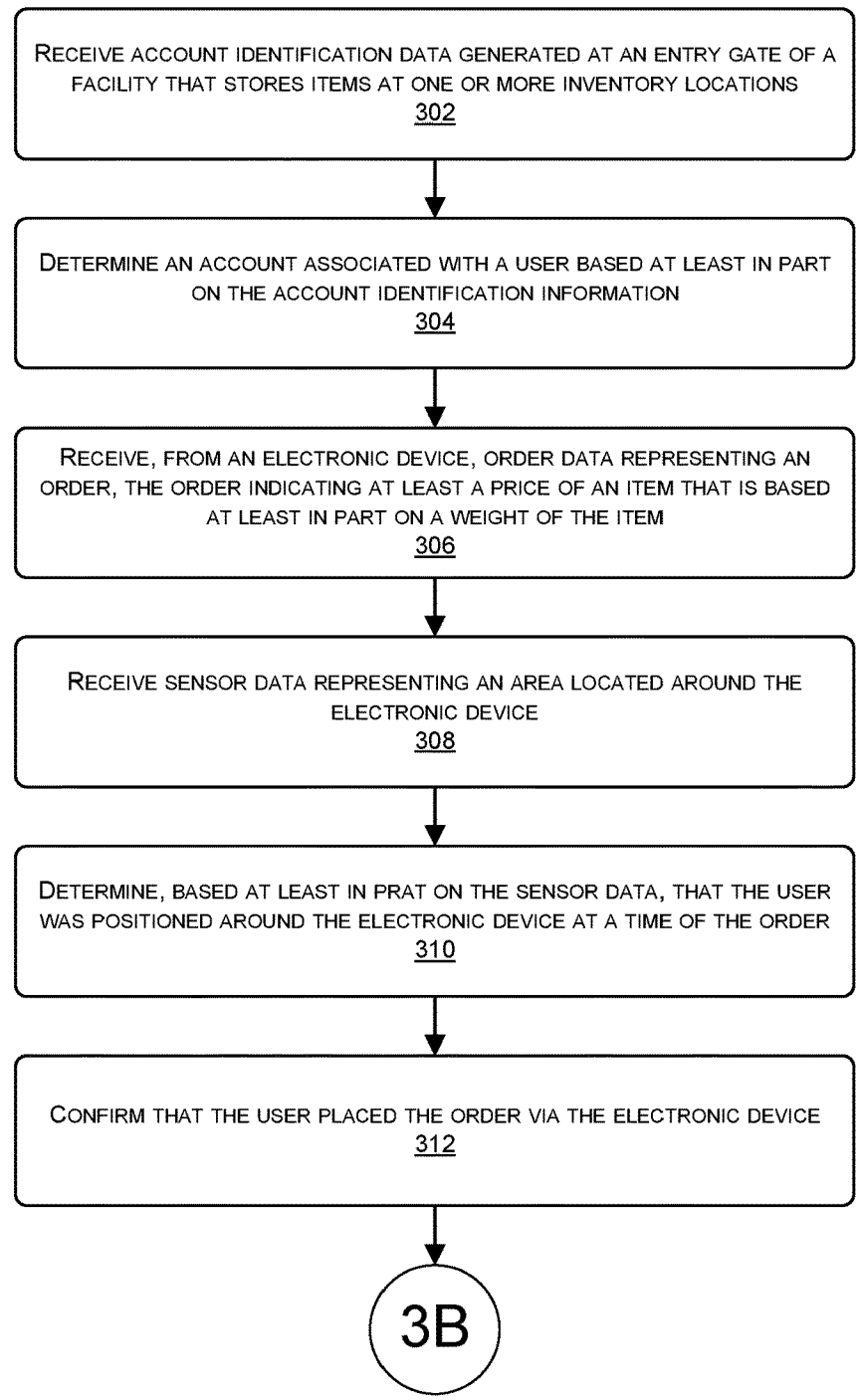
FIGS. 3A-3B are an example process for determining that an order is associated with a user and then processing a transaction associated with the order.
Figure 3B:
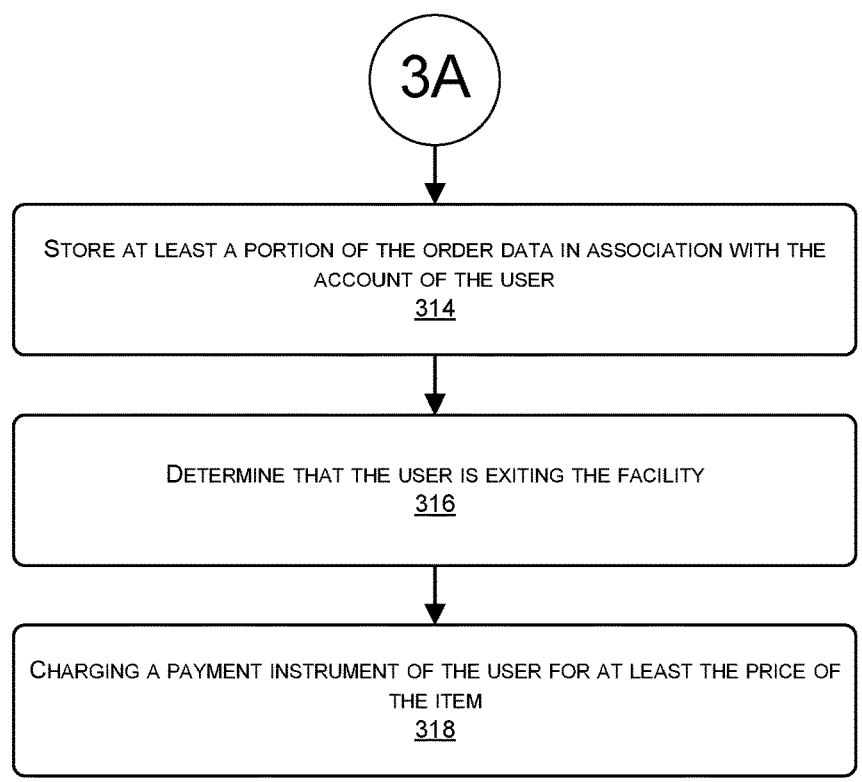
Figure 4:
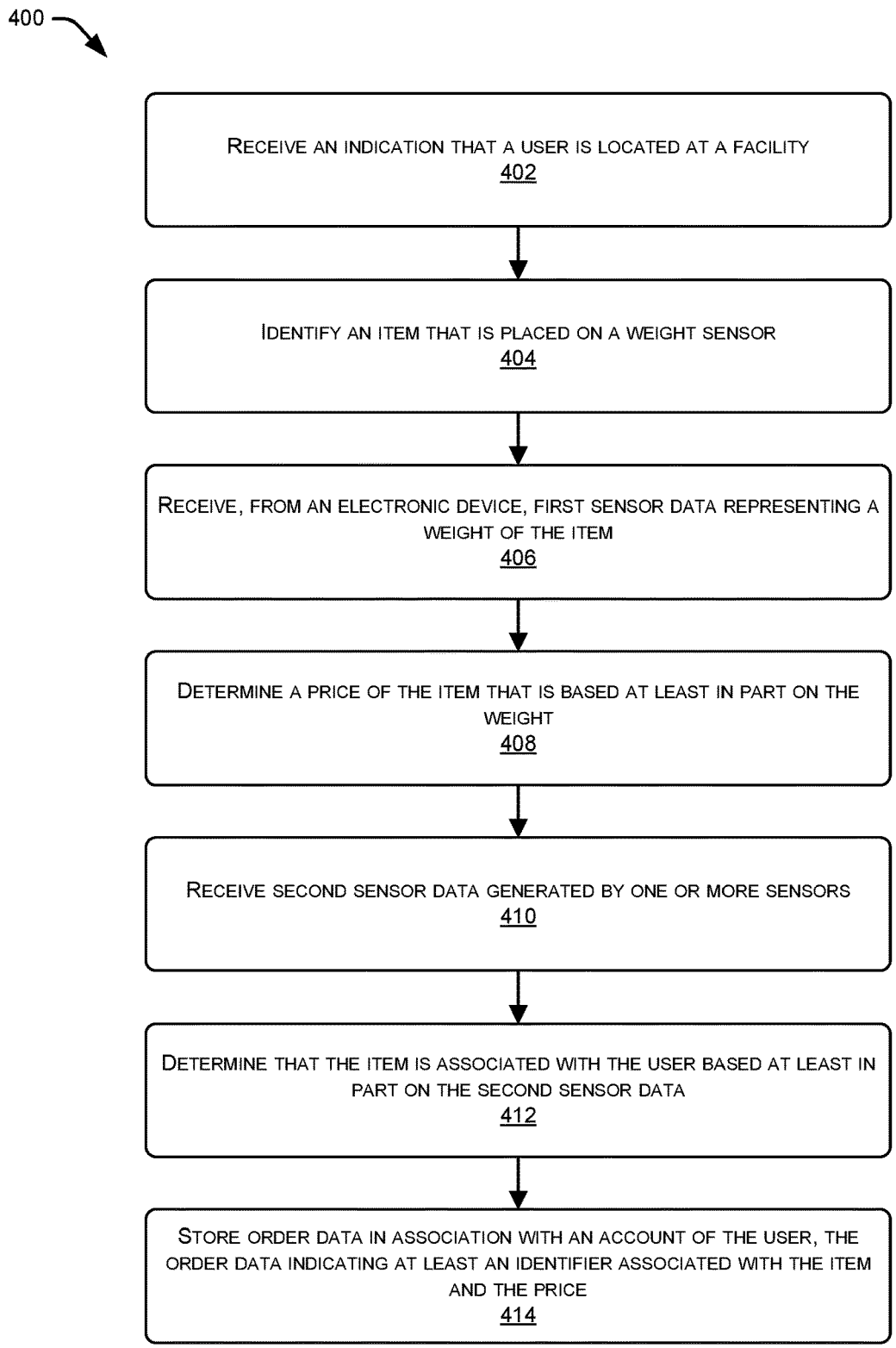
FIG. 4 is an example process for associating an order with an account of a user, where the order is for an item that is priced based at least in part on a weight of the item.

FIGS. 3A-4 illustrate various processes for implementing AC techniques for customers of facilities. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIGS. 3A-3B are an example process 300 for determining that an order is associated with a user and then processing a transaction associated with the order. At 302, the process 300 may include receiving account identification data scanned at an entry gate of a facility that stores items at one or more inventory location. For instance, a system may receive sensor data from one or more sensors located at the entry gate of the facility, where the sensor data represents the account identification data. In some examples, the account identification data includes a unique code and/or other identifier scanned from a mobile phone of the user. In some examples, the account identification data includes image data representing at least a portion of the user (e.g., image data representing the face of the user, image data representing the palm of the hand of the user, etc.). While these are just a couple of examples of account identification data, in other examples, the account identification data may include any type of data that identifies an account of the user.

At 304, the process 300 may include determining an account associated with a user based at least in part on the account identification information. For instance, the system may match the account identification data to stored account identification data that is associated with an account. Based at least in part on the match, the system may identify the account of the user. In some instances, the system then generates a record for the user located at the facility.

At 306, the process 300 may include receiving, from an electronic device, order data representing an order, the order indicating at least a price of an item that is based at least in part on a weight of the item. For instance, the system may receive the order data from the electronic device, where the electronic device is associated with a weight sensor for weighing items. In some instances, the order may further indicate a time at which the order occurred, an identifier of the item, a price per unit weight of the item, and/or other information. In some instances, before receiving the order data, the system sends item data to the electronic device, where the item data represents an identity of the item. The electronic device then uses the item data to perform the order.

At 308, the process 300 may include receiving sensor data representing an area located around the electronic device and at 310, the process 300 may include determining, based at least in part on the sensor data, that the user was positioned around the electronic device at a time of the order. For instance, the system may receive the sensor data from one or more sensors, such as one or more cameras, where the sensor data was generated at the time that the order was placed. The system may then analyze the sensor data to determine that the sensor data represents the user positioned around the electronic device. For example, if the sensor data includes image data, the system may analyze the image data to determine that at least an image represented by the image data depicts the user positioned around the electronic device.

At 312, the process 300 may include confirming that the user placed the order via the electronic device. For instance, based at least in part on the user being positioned around the electronic device at the time of the order, the system may confirm that the user placed the order. In some instances, the system may use one or more techniques to confirm that the user placed the order. For instance, the system may analyze sensor data and determine that the user removed the item from an inventory location prior to the order and/or determine that the user placed the item on the weight sensor. The system may then use one or more of these determinations to further confirm that the user placed the order.

At 314, the process 300 may include storing at least a portion of the order data in association with the account of the user. For instance, after confirming that the user placed the order, the system may store the at least the portion of the order data in association with the account. In some instances, prior to storing the at least the portion of the order data and/or after storing the at least the portion of the order data, the system may confirm that the user is removing the item. For example, the system may analyze sensor data to determine that the user did not return the item to the inventory location (and/or another inventory location).

At 316, the process 300 may include determining that the user is exiting the facility and at 318, the process 300 may include charging a payment instrument of the user for at least the price of the item. For instance, the system may receive sensor data indicating that the user is exiting the facility. Based at least in part on the user exiting the facility, the system may charge the payment instrument of the user for the price of the item. In some instances, the payment information is associated with the account of the user.

FIG. 4 is an example process 400 for associating an order with an account of a user, where the order is for an item that is priced based at least in part on a weight of the item. At 402, the process 400 may include receiving an indication that a user is located at a facility. For instance, a system may receive sensor data from one or more sensors located at the facility. In some examples, the sensor data includes a unique code and/or other identifier scanned from a mobile phone of the user. In some examples, the sensor data includes image data representing at least a portion of the user (e.g., image data representing the face of the user, image data representing the palm of the hand of the user, etc.). While these are just a couple of examples of account identification data, in other examples, the account identification data may include any type of data that identifies an account of the user.

At 404, the process 400 may include identifying an item that is placed on a weight sensor. For instance, the system may identify the item. In some instances, the system identifies the item by analyzing sensor data to determine that the user removed the item from an inventory location and/or placed the item on the weight sensor. In some instances, the system identifies the item by analyzing sensor data to determine that an associate removed the item from an inventory location and/or placed the item on the weight sensor. Still, in some instances, the system identifies the item by receiving, from an electronic device, data representing an identifier of the item.

At 406, the process 400 may include receiving, from an electronic device, first sensor data representing a weight of the item and at 408, the process 400 may include determining a price for the item that is based at least in part on the weight. For instance, the system may receive the first sensor data from the electronic device and determine the price that is based at least in part on the weight. In some instances, the system determines the price using the weight and data indicating a price per unit weight associated with the item. In some instances, the system determines the price based at least in part on receiving data from the electronic device that indicates the price.

At 410, the process 400 may include receiving second sensor data generated by one or more sensors and at 412, the process 400 may include determining that the item is associated with the user based at least in part on the second sensor data. For instance, the system may receive the second sensor data and then analyze the second sensor data to determine that the item is associated with the user. In some instances, to make the determination, the system may determine that the user was positioned around the electronic device at a time at which the item was being weighed. In some instances, to make the determination, the system may determine that the user removed the item from an inventory location and/or placed the item on the weight sensor.

At 414, the process 400 may include storing order data in association with an account of the user, the order data indicating at least an identifier associated with the item and the price. For instance, after determining that the item is associated with the user, the system may then store the order data in association with the account. In some instances, prior to storing the order data and/or after storing the order data, the system may confirm that the user is removing the item. For example, the system may analyze sensor data to determine that the user did not return the item to the inventory location (and/or another inventory location) and/or exited the facility with the item.

Figure 5:
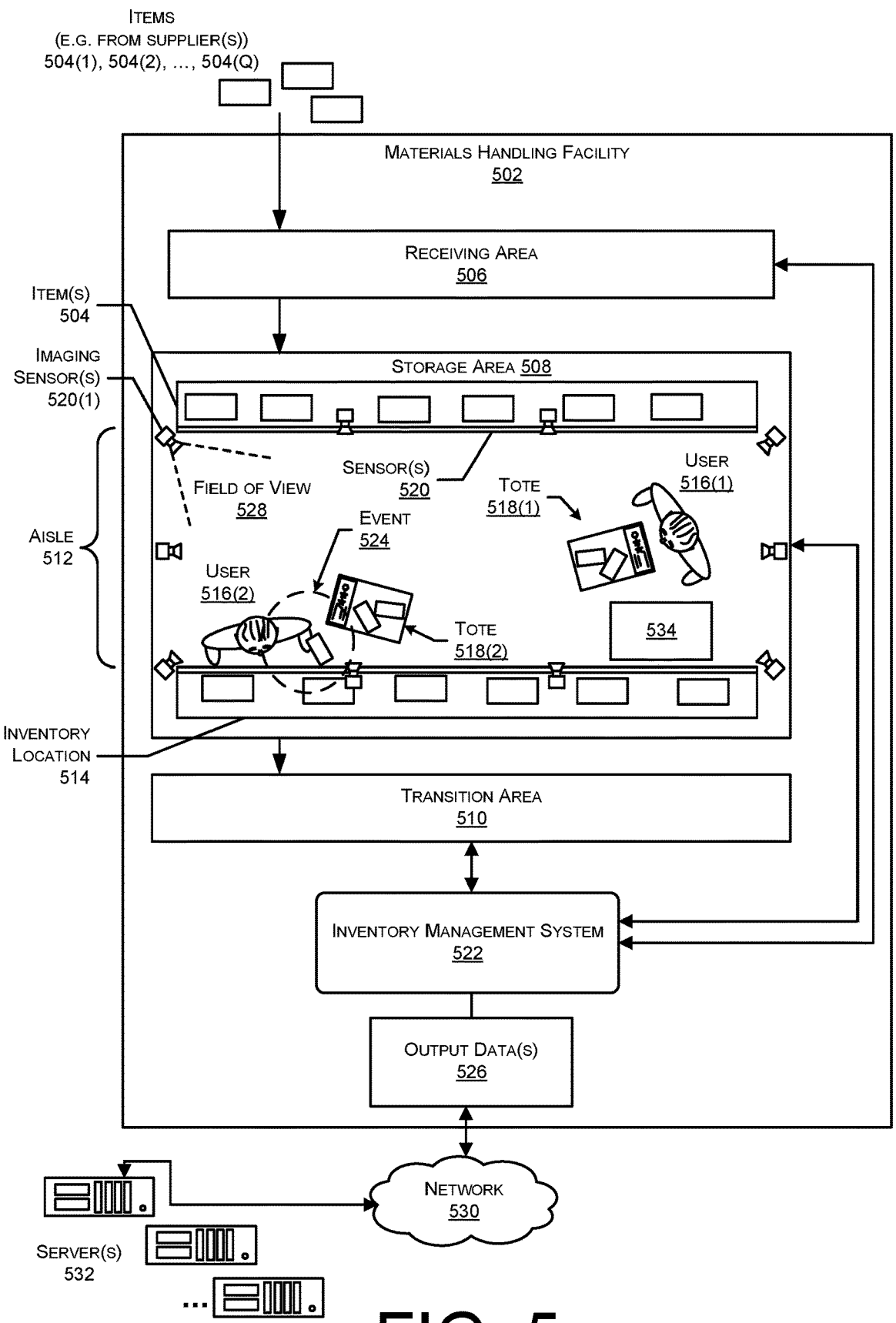
FIG. 5 is a block diagram of an example materials handling facility that includes sensors and an inventory management system configured to generate output regarding events occurring in the facility using the sensor data.
Figure 6:
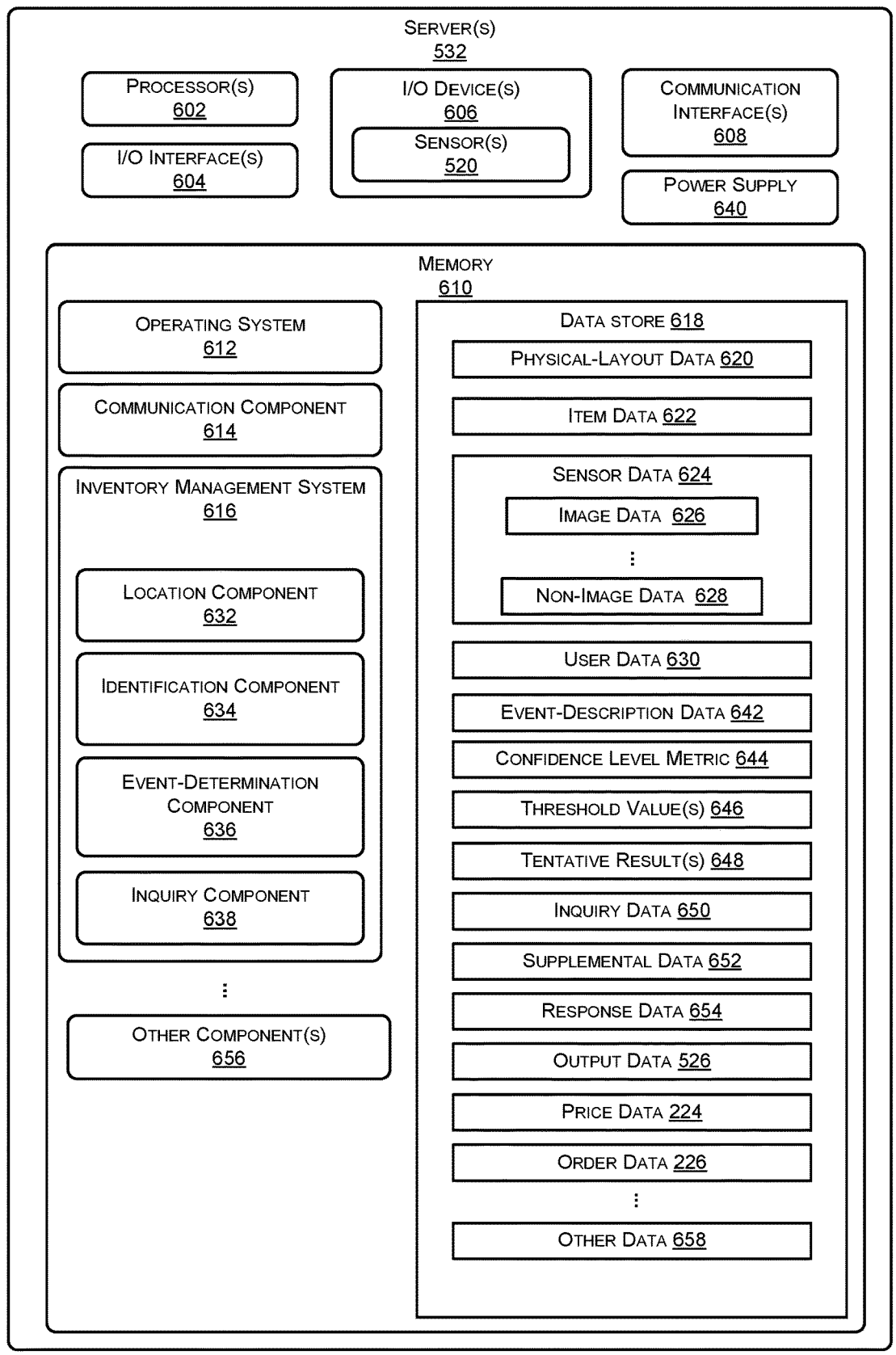
FIG. 6 illustrates a block diagram of one or more servers configured to support operation of the facility. As illustrated, the servers may include a checkout-eligibility component for determining whether a user is eligible to exit the facility with one or more picked items without performing a manual checkout of the items.

FIGS. 5 and 6 represent an illustrative materials handing environment, such as the materials handling facility 502, in which the techniques described herein may be applied to cameras monitoring the environments as described below. However, the following description is merely one illustrative example of an industry and environment in which the techniques described herein may be utilized. The materials handling facility 502 (or "facility") comprises one or more physical structures or areas within which one or more items 504(1), 504(2), . . . , 504(Q) (generally denoted as 504) may be held. As used in this disclosure, letters in parentheses such as "(Q)" indicate an integer result. The items 504 comprise physical goods, such as books, pharmaceuticals, repair parts, electronic gear, groceries, and so forth.

The facility 502 may include one or more areas designated for different functions with regard to inventory handling. In this illustration, the facility 502 includes a receiving area 506, a storage area 508, and a transition area 510. The receiving area 506 may be configured to accept items 504, such as from suppliers, for intake into the facility 502. For example, the receiving area 506 may include a loading dock at which trucks or other freight conveyances unload the items 504.

The storage area 508 is configured to store the items 504. The storage area 508 may be arranged in various physical configurations. In one implementation, the storage area 508 may include one or more aisles 512. The aisle 512 may be configured with, or defined by, inventory locations 514 on one or both sides of the aisle 512. The inventory locations 514 may include one or more of shelves, racks, cases, cabinets, bins, floor locations, or other suitable storage mechanisms for holding or storing the items 504. The inventory locations 514 may be affixed to the floor or another portion of the facility's structure, or may be movable such that the arrangements of aisles 512 may be reconfigurable. In some implementations, the inventory locations 514 may be configured to move independently of an outside operator. For example, the inventory locations 514 may comprise a rack with a power source and a motor, operable by a computing device to allow the rack to move from one location within the facility 502 to another.

One or more users 516(1), 516(2) (generally denoted as 516), totes 518(1), 518(2) (generally denoted as 518) or other material handling apparatus may move within the facility 502. For example, the users 516 may move about within the facility 502 to pick or place the items 504 in various inventory locations 514, placing them on the totes 518 for ease of transport. An individual tote 518 is configured to carry or otherwise transport one or more items 504. For example, a tote 518 may include a basket, a cart, a bag, and so forth. In other implementations, other agencies such as robots, forklifts, cranes, aerial drones, and so forth, may move about the facility 502 picking, placing, or otherwise moving the items 504.

One or more sensors 520 may be configured to acquire information in the facility 502. The sensors 520 in the facility 502 may include sensors fixed in the environment (e.g., ceiling-mounted cameras) or otherwise, such as sensors in the possession of users (e.g., mobile phones, tablets, etc.). The sensors 520 may include, but are not limited to, cameras 520(1), weight sensors, radio frequency (RF) receivers, temperature sensors, humidity sensors, vibration sensors, and so forth. The sensors 520 may be stationary or mobile, relative to the facility 502. For example, the inventory locations 514 may contain cameras 520(1) configured to acquire images of pick or placement of items 504 on shelves, of the users 516(1) and 516(2) in the facility 502, and so forth. In another example, the floor of the facility 502 may include weight sensors configured to determine a weight of the users 516 or another object thereupon.

During operation of the facility 502, the sensors 520 may be configured to provide information suitable for tracking how objects move or other occurrences within the facility 502. For example, a series of images acquired by a camera 520(1) may indicate removal of an item 504 from a particular inventory location 514 by one of the users 516 and placement of the item 504 on or at least partially within one of the totes 518.

While the storage area 508 is depicted as having one or more aisles 512, inventory locations 514 storing the items 504, sensors 520, and so forth, it is understood that the receiving area 506, the transition area 510, or other areas of the facility 502 may be similarly equipped. Furthermore, the arrangement of the various areas within the facility 502 is depicted functionally rather than schematically. For example, multiple different receiving areas 506, storage areas 508, and transition areas 510 may be interspersed rather than segregated in the facility 502.

The facility 502 may include, or be coupled to, an inventory management system 522, which may perform some or all of the techniques described above with reference to FIGS. 1A-4. For example, the inventory management system 522 may maintain a virtual cart of each user within the facility. The inventory management system 522 may also store a record associated with each user indicating the location of the user, and whether the user is eligible to exit the facility with one or more items without performing a manual checkout of the items. The inventory management system 522 may also generate and output notification data to the users, indicating whether or not they are so eligible.

As illustrated, the inventory management system 522 may reside at the facility 502 (e.g., as part of on-premises servers), on the servers 532 that are remote from the facility 502, a combination thereof. In each instance, the inventory management system 522 is configured to identify interactions and events with and between users 516, devices such as sensors 520, robots, material handling equipment, computing devices, and so forth, in one or more of the receiving area 506, the storage area 508, or the transition area 510. As described above, some interactions may further indicate the existence of one or more events 524, or predefined activities of interest. For example, events 524 may include the entry of the user 516 to the facility 502, stocking of items 504 at an inventory location 514, picking of an item 504 from an inventory location 514, returning of an item 504 to an inventory location 514, placement of an item 504 within a tote 518, movement of users 516 relative to one another, gestures by the users 516, and so forth. Other events 524 involving users 516 may include the user 516 providing authentication information in the facility 502, using a computing device at the facility 502 to authenticate the user to the inventory management system 522, and so forth. Some events 524 may involve one or more other objects within the facility 502. For example, the event 524 may comprise movement within the facility 502 of an inventory location 514, such as a counter mounted on wheels. Events 524 may involve one or more of the sensors 520. For example, a change in operation of a sensor 520, such as a sensor failure, change in alignment, and so forth, may be designated as an event 524. Continuing the example, movement of a camera 520(1) resulting in a change in the orientation of the field of view 528 (such as resulting from someone or something bumping the camera 520(1)) may be designated as an event 524.

By determining the occurrence of one or more of the events 524, the inventory management system 522 may generate output data 526. The output data 526 comprises information about the event 524. For example, where the event 524 comprises an item 504 being removed from an inventory location 514, the output data 526 may comprise an item identifier indicative of the particular item 504 that was removed from the inventory location 514 and a user identifier of a user that removed the item.

The inventory management system 522 may use one or more automated systems to generate the output data 526. For example, an artificial neural network, one or more classifiers, or other automated machine learning techniques may be used to process the sensor data from the one or more sensors 520 to generate output data 526. For example, the inventory management system 522 may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 526 or the tentative results. The automated systems may generate confidence level data that provides information indicative of the accuracy or confidence that the output data 526 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 504, user 516, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 516 may pick an item 504(1) such as a perfume bottle that is generally cubical in shape from the inventory location 514. Other items 504 at nearby inventory locations 514 may be predominantly spherical. Based on the difference in shape (cube vs. sphere) from the adjacent items, and the correspondence in shape with the previously stored image of the perfume bottle item 504(1) (cubical and cubical), the confidence level that the user 102 has picked up the perfume bottle item 504(1) is high.

In some situations, the automated techniques may be unable to generate output data 526 with a confidence level above a threshold result. For example, the automated techniques may be unable to distinguish which user 516 in a crowd of users 516 has picked up the item 504 from the inventory location 514. In other situations, it may be desirable to provide human confirmation of the event 524 or of the accuracy of the output data 526. For example, some items 504 may be deemed age restricted such that they are to be handled only by users 516 above a minimum age threshold.

In instances where human confirmation is desired, sensor data associated with an event 524 may be processed to generate inquiry data. The inquiry data may include a subset of the sensor data associated with the event 524. The inquiry data may also include one or more of one or more tentative results as determined by the automated techniques, or supplemental data. The subset of the sensor data may be determined using information about the one or more sensors 520. For example, camera data such as the location of the camera 520(1) within the facility 502, the orientation of the camera 520(1), and a field of view 528 of the camera 520(1) may be used to determine if a particular location within the facility 502 is within the field of view 528. The subset of the sensor data may include images that may show the inventory location 514 or that the item 504 was stowed. The subset of the sensor data may also omit images from other cameras 520(1) that did not have that inventory location 514 in the field of view 528. The field of view 528 may comprise a portion of the scene in the facility 502 that the sensor 520 is able to generate sensor data about.

Continuing the example, the subset of the sensor data may comprise a video clip acquired by one or more cameras 520(1) having a field of view 528 that includes the item 504. The tentative results may comprise the "best guess" as to which items 504 may have been involved in the event 524. For example, the tentative results may comprise results determined by the automated system that have a confidence level above a minimum threshold.

The facility 502 may be configured to receive different kinds of items 504 from various suppliers and to store them until a customer orders or retrieves one or more of the items 504. A general flow of items 504 through the facility 502 is indicated by the arrows of FIG. 5. Specifically, as illustrated in this example, items 504 may be received from one or more suppliers, such as manufacturers, distributors, wholesalers, and so forth, at the receiving area 506. In various implementations, the items 504 may include merchandise, commodities, perishables, or any suitable type of item 504, depending on the nature of the enterprise that operates the facility 502. The receiving of the items 504 may comprise one or more events 524 for which the inventory management system 522 may generate output data 526.

Upon being received from a supplier at receiving area 506, the items 504 may be prepared for storage. For example, items 504 may be unpacked or otherwise rearranged. The inventory management system 522 may include one or more software applications executing on a computer system to provide inventory management functions based on the events 524 associated with the unpacking or rearrangement. These inventory management functions may include maintaining information indicative of the type, quantity, condition, cost, location, weight, or any other suitable parameters with respect to the items 504. The items 504 may be stocked, managed, or dispensed in terms of countable, individual units or multiples, such as packages, cartons, crates, pallets, or other suitable aggregations. Alternatively, some items 504, such as bulk products, commodities, and so forth, may be stored in continuous or arbitrarily divisible amounts that may not be inherently organized into countable units. Such items 504 may be managed in terms of measurable quantity such as units of length, area, volume, weight, time, duration, or other dimensional properties characterized by units of measurement. Generally speaking, a quantity of an item 504 may refer to either a countable number of individual or aggregate units of an item 504 or a measurable amount of an item 504, as appropriate.

After arriving through the receiving area 506, items 504 may be stored within the storage area 508. In some implementations, like items 504 may be stored or displayed together in the inventory locations 514 such as in bins, on shelves, hanging from pegboards, and so forth. In this implementation, all items 504 of a given kind are stored in one inventory location 514. In other implementations, like items 504 may be stored in different inventory locations 514. For example, to optimize retrieval of certain items 504 having frequent turnover within a large physical facility 502, those items 504 may be stored in several different inventory locations 514 to reduce congestion that might occur at a single inventory location 514. Storage of the items 504 and their respective inventory locations 514 may comprise one or more events 524.

When a customer order specifying one or more items 504 is received, or as a user 516 progresses through the facility 502, the corresponding items 504 may be selected or "picked" from the inventory locations 514 containing those items 504. In various implementations, item picking may range from manual to completely automated picking. For example, in one implementation, a user 516 may have a list of items 504 they desire and may progress through the facility 502 picking items 504 from inventory locations 514 within the storage area 508, and placing those items 504 into a tote 518. In other implementations, employees of the facility 502 may pick items 504 using written or electronic pick lists derived from customer orders. These picked items 504 may be placed into the tote 518 as the employee progresses through the facility 502. Picking may comprise one or more events 524, such as the user 516 in moving to the inventory location 514, retrieval of the item 504 from the inventory location 514, and so forth.

After items 504 have been picked, they may be processed at a transition area 510. The transition area 510 may be any designated area within the facility 502 where items 504 are transitioned from one location to another or from one entity to another. For example, the transition area 510 may be a packing station within the facility 502. When the item 504 arrives at the transition area 510, the items 504 may be transitioned from the storage area 508 to the packing station. The transitioning may comprise one or more events 524. Information about the transition may be maintained by the inventory management system 522 using the output data 526 associated with those events 524.

In another example, if the items 504 are departing the facility 502 a list of the items 504 may be obtained and used by the inventory management system 522 to transition responsibility for, or custody of, the items 504 from the facility 502 to another entity. For example, a carrier may accept the items 504 for transport with that carrier accepting responsibility for the items 504 indicated in the list. In another example, a customer may purchase or rent the items 504 and remove the items 504 from the facility 502. The purchase or rental may comprise one or more events 524.

The inventory management system 522 may access or generate sensor data about the facility 502 and the contents therein including the items 504, the users 516, the totes 518, and so forth. The sensor data may be acquired by one or more of the sensors 520, data provided by other systems, and so forth. For example, the sensors 520 may include cameras 520(1) configured to acquire image data of scenes in the facility 502. The image data may comprise still images, video, or a combination thereof. The image data may be processed by the inventory management system 522 to determine a location of the user 516, the tote 518, the identifier of the user 516, and so forth. As used herein, the identity of the user may represent a unique identifier of the user (e.g., name, number associated with user, username, etc.), an identifier that distinguishes the user amongst other users being located within the environment, or the like.

The inventory management system 522, or systems coupled thereto, may be configured to associate an account with the user 516, as well as to determine other candidate users. An account of the user 516 may be determined before, during, or after entry to the facility 502.

In some instances, the inventory management system 522 groups users within the facility into respective sessions. That is, the inventory management system 522 may utilize the sensor data to determine groups of users that are effectively "together" (e.g., shopping together). In some instances, a particular session may include multiple users that entered the facility 502 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in her tote 518. Noting the child and the mother as belonging to the same session may increase the chances of successfully adding the box of cereal to the virtual shopping cart of the mother.

By determining the occurrence of one or more events 524 and the output data 526 associated therewith, the inventory management system 522 is able to provide one or more services to the users 516 of the facility 502. By utilizing one or more facility associates to process inquiry data and generate response data that may then be used to produce output data 526, overall accuracy of the system may be enhanced. The enhanced accuracy may improve the user experience of the one or more users 516 of the facility 502. In some examples, the output data 526 may be transmitted over a network 530 to one or more servers 532.

As further illustrated in FIG. 5, the facility 502 may include one or more stations 534 (although one is only illustrated for clarity reasons) that the users 516 may use for items that are priced per unit weight. The station 534 may include an electronic device (e.g., the electronic device 202) and a weight sensor (e.g., the weight sensor 222).

FIG. 6 illustrates a block diagram of the one or more servers 532. The servers 532 may be physically present at the facility 502, may be accessible by the network 530, or a combination of both. The servers 532 do not require end-user knowledge of the physical location and configuration of the system that delivers the services. Common expressions associated with the servers 532 may include "on-demand computing," "software as a service (SaaS)," "cloud services," "data centers," and so forth. Services provided by the servers 532 may be distributed across one or more physical or virtual devices.

The servers 532 may include one or more hardware processors 602 (processors) configured to execute one or more stored instructions. The processors 602 may comprise one or more cores. The servers 532 may include one or more input/output (I/O) interface(s) 604 to allow the processor 602 or other portions of the servers 532 to communicate with other devices. The I/O interfaces 604 may comprise Inter-Integrated Circuit (I2C), Serial Peripheral Interface bus (SPI), Universal Serial Bus (USB) as promulgated by the USB Implementers Forum, and so forth.

The servers 532 may also include one or more communication interfaces 608. The communication interfaces 608 are configured to provide communications between the servers 532 and other devices, such as the sensors 520, the interface devices, routers, and so forth. The communication interfaces 608 may include devices configured to couple to personal area networks (PANs), wired and wireless local area networks (LANs), wired and wireless wide area networks (WANs), and so forth. For example, the communication interfaces 608 may include devices compatible with Ethernet, Wi-Fi™, and so forth. The servers 532 may also include one or more busses or other internal communications hardware or software that allow for the transfer of data between the various modules and components of the servers 532.

The servers 532 may also include a power supply 608. The power supply 640 is configured to provide electrical power suitable for operating the components in the servers 532.

The servers 532 may further include one or more memories 610. The memory 610 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 610 provides storage of computer-readable instructions, data structures, program modules, and other data for the operation of the servers 532. A few example functional modules are shown stored in the memory 610, although the same functionality may alternatively be implemented in hardware, firmware, or as a system on a chip (SOC).

The memory 610 may include at least one operating system (OS) component 612. The OS component 612 is configured to manage hardware resource devices such as the I/O interfaces 604, the communication interfaces 608, and provide various services to applications or components executing on the processors 602. The OS component 612 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 610. These components may be executed as foreground applications, background tasks, daemons, and so forth. A communication component 614 may be configured to establish communications with one or more of the sensors 520, one or more of the devices used by associates, other servers 532, or other devices. The communications may be authenticated, encrypted, and so forth.

The memory 610 may store an inventory management system 616. The inventory management system 616 is configured to provide the inventory functions as described herein with regard to the inventory management system 522. For example, the inventory management system 616 may track movement of items 504 in the facility 502, generate user interface data, and so forth.

The inventory management system 616 may access information stored in one or more data stores 618 in the memory 610. The data store 618 may use a flat file, database, linked list, tree, executable code, script, or other data structure to store the information. In some implementations, the data store 618 or a portion of the data store 618 may be distributed across one or more other devices including other servers 532, network attached storage devices, and so forth.

The data store 618 may include physical layout data 620. The physical layout data 620 provides a mapping of physical locations within the physical layout of devices and objects such as the sensors 520, inventory locations 514, and so forth. The physical layout data 620 may indicate the coordinates within the facility 502 of an inventory location 514, sensors 520 within view of that inventory location 514, and so forth. For example, the physical layout data 620 may include camera data comprising one or more of a location within the facility 502 of a camera 520(1), orientation of the camera 520(1), the operational status, and so forth. Continuing example, the physical layout data 620 may indicate the coordinates of the camera 520(1), pan and tilt information indicative of a direction that the field of view 528 is oriented along, whether the camera 520(1) is operating or malfunctioning, and so forth.

In some implementations, the inventory management system 616 may access the physical layout data 620 to determine if a location associated with the event 524 is within the field of view 528 of one or more sensors 520. Continuing the example above, given the location within the facility 502 of the event 524 and the camera data, the inventory management system 616 may determine the cameras 520(1) that may have generated images of the event 524.

The item data 622 (which may include the item data 218) comprises information associated with the items 504. The information may include information indicative of one or more inventory locations 514 at which one or more of the items 504 are stored. The item data 622 may also include order data, SKU or other product identifier, price, quantity on hand, weight, expiration date, images of the item 504, detail description information, ratings, ranking, and so forth. The inventory management system 616 may store information associated with inventory management functions in the item data 622.

The data store 618 may also include sensor data 624. The sensor data 624 comprises information acquired from, or based on, the one or more sensors 520. For example, the sensor data 624 may comprise 3D information about an object in the facility 502. As described above, the sensors 520 may include a camera 520(1), which is configured to acquire one or more images. These images may be stored as the image data 626. The image data 626 may comprise information descriptive of a plurality of picture elements or pixels. Non-image data 628 may comprise information from other sensors 520, such as input from microphones, weight sensors, and so forth.

User data 630 may also be stored in the data store 618. The user data 630 may include identity data, information indicative of a profile, purchase history, location data, and so forth. Individual users 516 or groups of users 516 may selectively provide user data 630 for use by the inventory management system 522. The individual users 516 or groups of users 516 may also authorize collection of the user data 630 during use of the facility 502 or access to user data 630 obtained from other systems. For example, the user 516 may opt-in to collection of the user data 630 to receive enhanced services while using the facility 502.

In some implementations, the user data 630 may include information designating a user 516 for special handling. For example, the user data 630 may indicate that a particular user 516 has been associated with an increased number of errors with respect to output data 526. The inventory management system 616 may be configured to use this information to apply additional scrutiny to the events 524 associated with this user 516. For example, events 524 that include an item 504 having a cost or result above the threshold amount may be provided to a facility associate for processing regardless of the determined level of confidence in the output data 526 as generated by the automated system.

The inventory management system 616 may include one or more of a location component 632, identification component 634, event-determination component 636, and inquiry component 638, potentially amongst other components 656.

The location component 632 functions to locate items or users within the environment of the facility to allow the inventory management system 616 to assign certain events to the correct users. That is, the location component 632 may assign unique identifiers to users as they enter the facility and, with the users' consent, may locate the users throughout the facility 502 over the time they remain in the facility 502. The location component 632 may perform this locating using sensor data 624, such as the image data 626. For example, the location component 632 may receive the image data 626 and may use facial-recognition techniques to identify users from the images. After identifying a particular user within the facility, the location component 632 may then locate the user within the images as the user moves throughout the facility 502. Further, should the location component 632 temporarily "lose" a particular user, the location component 632 may again attempt to identify the users within the facility based on facial recognition, and/or using other techniques such as voice recognition, or the like.

Therefore, upon receiving the indication of the time and location of the event in question, the location component 632 may query the data store 618 to determine which one or more users were at or within a threshold distance of the location of the event at the particular time of the event. Further, the location component 632 may assign different confidence levels to different users, with the confidence levels indicating how likely it is that each corresponding user is the user that is in fact associated with the event of interest.

The location component 632 may access the sensor data 624 in order to determine this location data of the user and/or items. The location data provides information indicative of a location of an object, such as the item 504, the user 516, the tote 518, and so forth. The location may be absolute with respect to the facility 502 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 502, 5.2 m from an inventory location 514 along a heading of 169°, and so forth. For example, the location data may indicate that the user 516(1) is 25.2 m along the aisle 512(1) and standing in front of the inventory location 514. In comparison, a relative location may indicate that the user 516(1) is 32 cm from the tote 518 at a heading of 73° with respect to the tote 518. The location data may include orientation information, such as which direction the user 516 is facing. The orientation may be determined by the relative direction the user's 516 body is facing. In some implementations, the orientation may be relative to the interface device. Continuing the example, the location data may indicate that the user 516(1) is oriented with a heading of 0°, or looking north. In another example, the location data may indicate that the user 516 is facing towards the interface device.

The identification component 634 is configured to identify an object. In one implementation, the identification component 634 may be configured to identify an item 504. In another implementation, the identification component 634 may be configured to identify the user 516. For example, the identification component 634 may use facial recognition techniques to process the image data 626 and determine the user 516 depicted in the images by comparing the characteristics in the image data 626 with previously stored results. The identification component 634 may also access data from other sensors 520, such as from an RFID reader, an RF receiver, and so forth.

The event-determination component 636 is configured to process the sensor data 624 and generate output data 526, and may include components described above. The event-determination component 636 may access information stored in the data store 618 including, but not limited to, event-description data 642, confidence levels 644, or threshold values 646. In some instances, the event-determination component 636 may be configured to perform some or all of the techniques described above with regards to the event-determination component 636. For instance, the event-determination component 636 may be configured to create and utilize event classifiers for identifying events (e.g., predefined activity) within image data, potentially without use of other sensor data acquired by other sensors in the environment.

The event-description data 642 comprises information indicative of one or more events 524. For example, the event-description data 642 may comprise predefined profiles that designate movement of an item 504 from an inventory location 514 with the event 524 of "pick". The event-description data 642 may be manually generated or automatically generated. The event-description data 642 may include data indicative of triggers associated with events occurring in the facility 502. An event may be determined as occurring upon detection of the trigger. For example, sensor data 624 such as a change in weight from a weight sensor 520 at an inventory location 514 may trigger detection of an event of an item 504 being added or removed from the inventory location 514. In another example, the trigger may comprise an image of the user 516 reaching a hand toward the inventory location 514. In yet another example, the trigger may comprise two or more users 516 approaching to within a threshold distance of one another.

The event-determination component 636 may process the sensor data 624 using one or more techniques including, but not limited to, artificial neural networks, classifiers, decision trees, support vector machines, Bayesian networks, and so forth. For example, the event-determination component 636 may use a decision tree to determine occurrence of the "pick" event 524 based on sensor data 624. The event-determination component 636 may further use the sensor data 624 to determine one or more tentative results 648. The one or more tentative results 648 comprise data associated with the event 524. For example, where the event 524 comprises a disambiguation of users 516, the tentative results 648 may comprise a list of possible user 516 identities. In another example, where the event 524 comprises a disambiguation between items, the tentative results 648 may comprise a list of possible item identifiers. In some implementations, the tentative result 648 may indicate the possible action. For example, the action may comprise the user 516 picking, placing, moving an item 504, damaging an item 504, providing gestural input, and so forth.

In some implementations, the tentative results 648 may be generated by other components. For example, the tentative results 648 such as one or more possible identities or locations of the user 516 involved in the event 524 may be generated by the location component 632. In another example, the tentative results 648 such as possible items 504 that may have been involved in the event 524 may be generated by the identification component 634.

The event-determination component 636 may be configured to provide a confidence level 644 associated with the determination of the tentative results 648. The confidence level 644 provides indicia as to the expected level of accuracy of the tentative result 648. For example, a low confidence level 644 may indicate that the tentative result 648 has a low probability of corresponding to the actual circumstances of the event 524. In comparison, a high confidence level 644 may indicate that the tentative result 648 has a high probability of corresponding to the actual circumstances of the event 524.

In some implementations, the tentative results 648 having confidence levels 644 that exceed the threshold may be deemed to be sufficiently accurate and thus may be used as the output data 656. For example, the event-determination component 636 may provide tentative results 648 indicative of the three possible items 504(1), 504(2), and 504(3) corresponding to the "pick" event 524. The confidence levels 644 associated with the possible items 504(1), 504(2), and 504(3) may be 25%, 70%, 92%, respectively. Continuing the example, the threshold value 646 may be set such that confidence level 644 of 90% are deemed to be sufficiently accurate. As a result, the event-determination component 636 may designate the "pick" event 524 as involving item 504(3).

The inquiry component 638 may be configured to use at least a portion of the sensor data 624 associated with the event 524 to generate inquiry data 650. In some implementations, the inquiry data 650 may include one or more of the tentative results 648 or supplemental data 652. The inquiry component 638 may be configured to provide inquiry data 650 to one or more devices associated with one or more human associates.

An associate user interface is presented on the respective devices of associates. The associate may generate response data 654 by selecting a particular tentative result 648, entering new information, indicating that they are unable to answer the inquiry, and so forth.

The supplemental data 652 comprises information associated with the event 524 or that may be useful in interpreting the sensor data 624. For example, the supplemental data 652 may comprise previously stored images of the items 504. In another example, the supplemental data 652 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 626 during presentation to an associate.

The inquiry component 638 processes the response data 654 provided by the one or more associates. The processing may include calculating one or more statistical results associated with the response data 654. For example, statistical results may include a count of the number of times associates selected a particular tentative result 648, determination of a percentage of the associates that selected a particular tentative result 648, and so forth.

The inquiry component 638 is configured to generate the output data 656 based at least in part on the response data 654. For example, given that a majority of the associates returned response data 654 indicating that the item 504 associated with the "pick" event 524 is item 504(5), the output data 526 may indicate that the item 504(5) was picked.

The inquiry component 638 may be configured to selectively distribute inquiries to particular associates. For example, some associates may be better suited to answering particular types of inquiries. Performance data, such as statistical data about the performance of the associates, may be determined by the inquiry component 638 from the response data 654 provided by the associates. For example, information indicative of a percentage of different inquiries in which the particular associate selected response data 654 that disagreed with the majority of associates may be maintained. In some implementations, test or practice inquiry data 650 having a previously known correct answer may be provided to the associate for training or quality assurance purposes. The determination of the set of associates to use may be based at least in part on the performance data.

By using the inquiry component 638, the event-determination component 636 may be able to provide high reliability output data 656 that accurately represents the event 524. The output data 656 generated by the inquiry component 638 from the response data 654 may also be used to further train the automated systems used by the inventory management system 616. For example, the sensor data 624 and the output data 656, based on response data 654, may be provided to one or more of the components of the inventory management system 616 for training in process improvement. Continuing the example, this information may be provided to an artificial neural network, Bayesian network, and so forth, to further train these systems such that the confidence level 644 and the tentative results 648 produced in the future for the same or similar input is improved. Finally, as FIG. 6 illustrates, the servers 532 may store and/or utilize other data 658.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
   one or more processors; and
   one or more computer-readable media storing instructions that, when executed by the one or more processors, cause the one or more processors to perform operations comprising:
      determining an account associated with a user;
      receiving, from an electronic device that is associated with a scale, order data representing at least:
         a first time;
         an identifier of an item;
         a weight of the item; and
         a price of the item that is based at least in part on the weight;
      receiving image data generated by a camera, the image data representing at least an area at which the scale is located;
      analyzing the image data to determine that the user was positioned at the scale at a second time;
      determining that the second time is within a threshold period of time to the first time;
      confirming, based at least in part on the second time being within the threshold period of time to the first time, that the user placed the item on the scale;
      storing at least a portion of the order data in association with the account determining that the user is exiting the facility; and
      based at least in part on determining that the user is exiting the facility, charging a payment instrument of the user for at least the price of the item.

2. The system as recited in claim 1, the operations further comprising:
receiving additional image data generated by the camera or an additional camera;
analyzing the additional image data to determine that the user removed the item from an inventory location associated with the item; and
sending, to the electronic device, item data representing the item.

3. The system as recited in claim 1, the operations further comprising:
receiving additional image data generated by the camera or an additional camera; and
analyzing the additional image data to determine that the user removed the item from an area of the facility, the area including at least one of an inventory location associated with the item or the scale,
and wherein storing the at least the portion of the order data in association with the account is based at least in part on determining that the user removed the item from the area of the facility.

4. A method comprising:
receiving an indication that a user is located at a facility;
identifying an item that is placed on a weight sensor at a first time;
receiving, from an electronic device that is associated with the weight sensor, first sensor data representing a weight of the item;
determining a price of the item that is based at least in part on the weight;
receiving second sensor data generated by a camera;
determining, based at least in part on the second sensor data, the user was positioned at the weight sensor at a second time;
determining, based at least in part on the first time and the second time, that the item is associated with the user; and
storing event data associated with an account associated with the user, the event data indicating at least an identifier associated with the item and the price.

5. The method as recited in claim 4, further comprising:
detecting the user exiting the facility; and
based at least in part on detecting that the user is exiting the facility, charging a payment instrument of the user for the price of the item.

6. The method as recited in claim 4, wherein identifying the item that is placed on the weight sensor comprises receiving, from the electronic device, item data representing the identifier associated with the item.

7. The method as recited in claim 4, wherein identifying the item that is placed on the weight sensor comprises:
receiving third sensor data generated by one or more sensors;
determining, based at least in part on the third sensor data, that the user removed the item from an inventory location; and
determining, based at least in part on at least one of the second sensor data or the third sensor data, that the user placed the item on the weight sensor.

8. The method as recited in claim 7, further comprising:
determining that the inventory location is associated with a price per unit weight; and
determining, based at least in part on the user removing the item from the inventory location, that the item removed by the user is associated with the price per unit weight.

9. The method as recited in claim 4, wherein:
identifying the item that is placed on the weight sensor comprises:
receiving third sensor data generated by one or more sensors;
determining, based at least in part on the third sensor data, that an associate of the facility removed the item from an inventory location; and
determining, based at least in part on the third sensor data, that the associate placed the item on the weight sensor; and
determining that the item is associated with the user is further based at least in part on the user receiving the item from the associate.

10. The method as recited in claim 4, wherein determining the price of the item comprises receiving, from the electronic device, price data representing the price of the item.

11. The method as recited in claim 4, wherein determining the price of the item comprises:
storing price data representing a price per unit weight associated with the item; and
determining the price of the item based at least in part on the weight and price per unit weight.

12. The method as recited in claim 4, further comprising sending, to the electronic device and based at least in part on identifying the item that is placed on the weight sensor, item data representing the identifier associated with the item.

13. The method as recited in claim 4, further comprising:
receiving third sensor data generated by one or more sensors; and
determining, based at least in part on the third sensor data, that the user did not return the item to the inventory location;
and wherein storing the event data is based at least in part on determining that the user did not return the item to the inventory location.

14. The method as recited in claim 4, further comprising:
determining that the second time is within a threshold period of time to the first time,
and wherein determining that the item is associated with the user is based at least in part on the second time being within the threshold period of time to the first time.

15. The method as recited in claim 4, wherein determining that the user was positioned at the weight sensor at the second time comprises determining, based at least in part on the second sensor data, that the user was located within a threshold distance to the weight sensor at the second time.

16. The method as recited in claim 4, wherein determining that the user was positioned at the weight sensor at the second time comprises determining, based at least in part on the second sensor data, that the user placed the item on the weight sensor at the second time.

17. A system comprising:
one or more processors; and
one or more computer-readable media storing instructions that, when executed by the one or more processors, cause the one or more processors to perform operations comprising:
identifying an item that is placed on a weight sensor at a first time;
receiving, from an electronic device that is associated with the weight sensor, first sensor data representing a weight of the item;

determining a price of the item that is based at least in part on the weight;

receiving second sensor data generated by a camera;

determining, based at least in part on the second sensor data, a user was positioned at the weight sensor at a second time;

determining, based at least in part on the first time and the second time, that the item is associated with the user; and storing event data associated with an account associated with the user, the event data indicating at least an identifier associated with the item and the price.

18. The system as recited in claim 17, the operations further comprising:

detecting the user exiting the facility; and based at least in part on detecting that the user is exiting the facility, charging a payment instrument of the user for the price of the item.

19. The system as recited in claim 17, wherein identifying the item that is placed on the weight sensor comprises receiving, from the electronic device, item data representing the identifier associated with the item.

20. The system as recited in claim 17, wherein identifying the item that is placed on the weight sensor comprises:

receiving third sensor data generated by one or more sensors;

determining, based at least in part on the third sensor data, that the user removed the item from an inventory location; and determining, based at least in part on at least one of the second sensor data or the third sensor data, that the user placed the item on the weight sensor.

* * * * *